United States Patent
Kojima et al.

(10) Patent No.: US 9,103,680 B2
(45) Date of Patent: Aug. 11, 2015

(54) LOCAL MAP GENERATING DEVICE, LOCAL MAP GENERATING SYSTEM, GLOBAL MAP GENERATING DEVICE, GLOBAL MAP GENERATING SYSTEM, AND PROGRAM

(75) Inventors: Yoshiko Kojima, Nagoya (JP); Noriyoshi Suzuki, Nagoya (JP); Junichi Meguro, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 12 days.

(21) Appl. No.: 14/002,890

(22) PCT Filed: Mar. 2, 2012

(86) PCT No.: PCT/JP2012/055464
§ 371 (c)(1),
(2), (4) Date: Nov. 18, 2013

(87) PCT Pub. No.: WO2012/118207
PCT Pub. Date: Sep. 7, 2012

(65) Prior Publication Data
US 2014/0074393 A1    Mar. 13, 2014

(30) Foreign Application Priority Data

Mar. 3, 2011 (JP) ................................. 2011-046349

(51) Int. Cl.
*G01C 21/32* (2006.01)
*G01C 21/00* (2006.01)
(Continued)

(52) U.S. Cl.
CPC ............... *G01C 21/00* (2013.01); *G01C 21/32* (2013.01); *G06T 17/05* (2013.01); *G06K 9/00664* (2013.01)

(58) Field of Classification Search
CPC ........ G01C 21/00; G01C 21/30; G01C 21/32; G08G 1/0969
USPC ................. 701/409, 412, 446, 301, 445, 533; 348/239, 94, 148; 455/456.1
See application file for complete search history.

(56) References Cited

U.S. PATENT DOCUMENTS 5,999,878 A * 12/1999 Hanson et al. ................ 701/445
6,163,755 A * 12/2000 Peer et al. ..................... 701/301
(Continued)

FOREIGN PATENT DOCUMENTS

JP    A-10-063181    3/1998
JP    A-2002-206934    7/2002
(Continued)

OTHER PUBLICATIONS

Misra et al., "*Global Positioning System: Signals, Measurements, and Performance*," 2nd Edition, Gang-Jamuna Press, pp. 115-129, 2004 (With Translation).
(Continued)

*Primary Examiner* — Tan Q Nguyen
(74) *Attorney, Agent, or Firm* — Oliff PLC

(57) ABSTRACT

An image pickup device picks-up forward images, and a GPS information acquiring section acquires satellite information that includes Doppler frequencies. A position/velocity vector computing section computes a velocity vector by using the Doppler frequencies. A locus computing section computes a locus of positions of ones own vehicle. A projected image generating section generates, from the forward images, projected images that are projected onto a road surface. A local map generating section records road surface images, that are obtained for respective points on the locus of ones own vehicle, at respective regions of a local map that is determined on the basis of a traveling direction of a moving body at each point on the locus and a set position and a posture of the image pickup device. Due thereto, a local map generating device can, by a simple structure, generate a highly accurate map.

15 Claims, 24 Drawing Sheets

(51) Int. Cl.
*G06T 17/05* (2011.01)
*G08G 1/0969* (2006.01)
*G06K 9/00* (2006.01)

(56) References Cited

U.S. PATENT DOCUMENTS

| | | | | |
|---|---|---|---|---|
| 6,832,156 | B2* | 12/2004 | Farmer | 701/301 |
| 2004/0257440 | A1* | 12/2004 | Kondo et al. | 348/94 |
| 2005/0085242 | A1* | 4/2005 | Nishizawa | 455/456.1 |
| 2005/0088544 | A1* | 4/2005 | Wang | 348/239 |
| 2012/0287279 | A1* | 11/2012 | Tanaka et al. | 348/148 |

FOREIGN PATENT DOCUMENTS

| JP | A-2005-134429 | 5/2005 |
|---|---|---|
| JP | A-2006-138834 | 6/2006 |
| JP | A-2006-242978 | 9/2006 |
| JP | A-2007-249103 | 9/2007 |
| JP | A-2008-065087 | 3/2008 |
| JP | A-2008-249639 | 10/2008 |
| JP | A-2009-109203 | 5/2009 |
| JP | A-2009-223220 | 10/2009 |
| JP | A-2009-250895 | 10/2009 |
| JP | A-2010-175756 | 8/2010 |

OTHER PUBLICATIONS

Japanese Office Action issued in Application No. 2011-046349; Dated Jul. 23, 2013 (With Translation).
International Search Report issued in Application No. PCT/JP2012/055464; Dated Apr. 10, 2012 (With Translation).

* cited by examiner

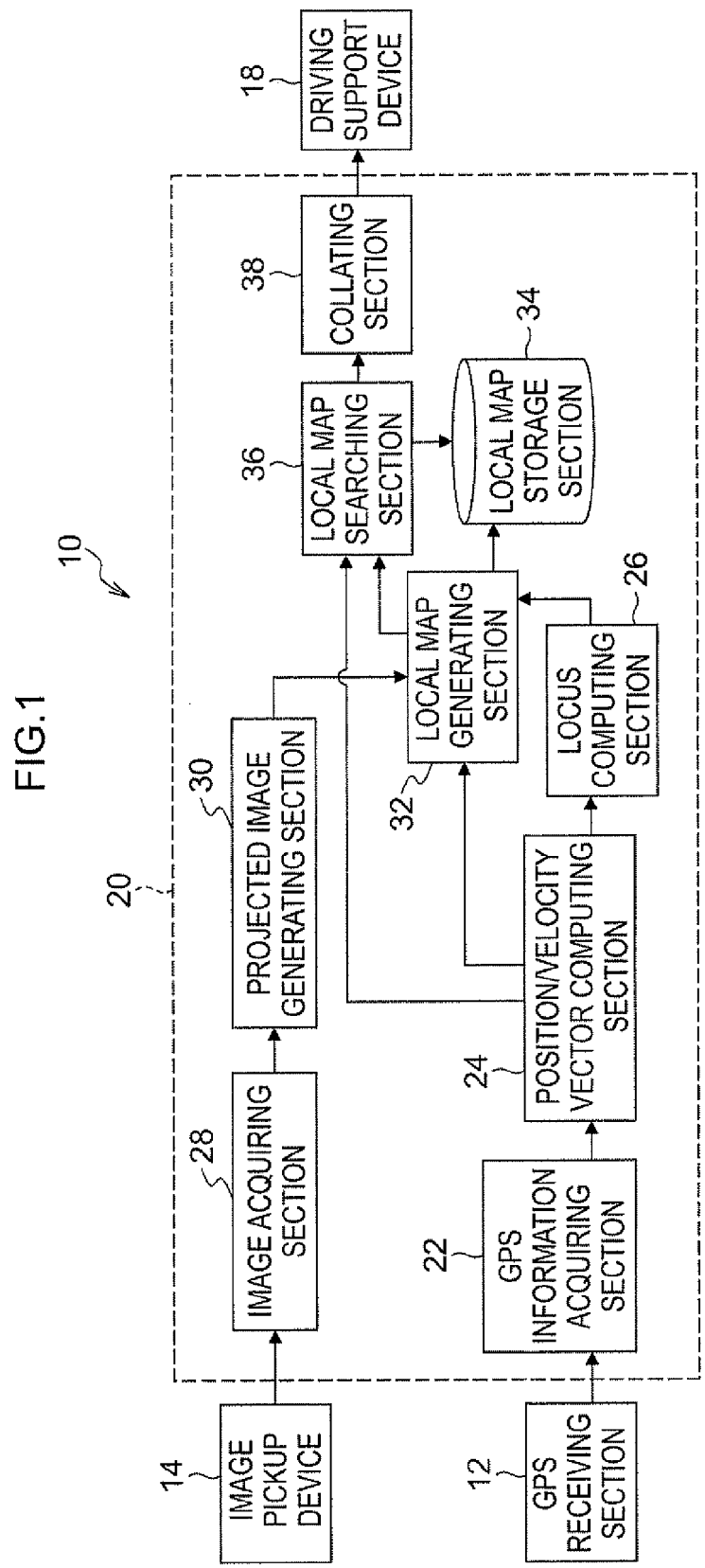

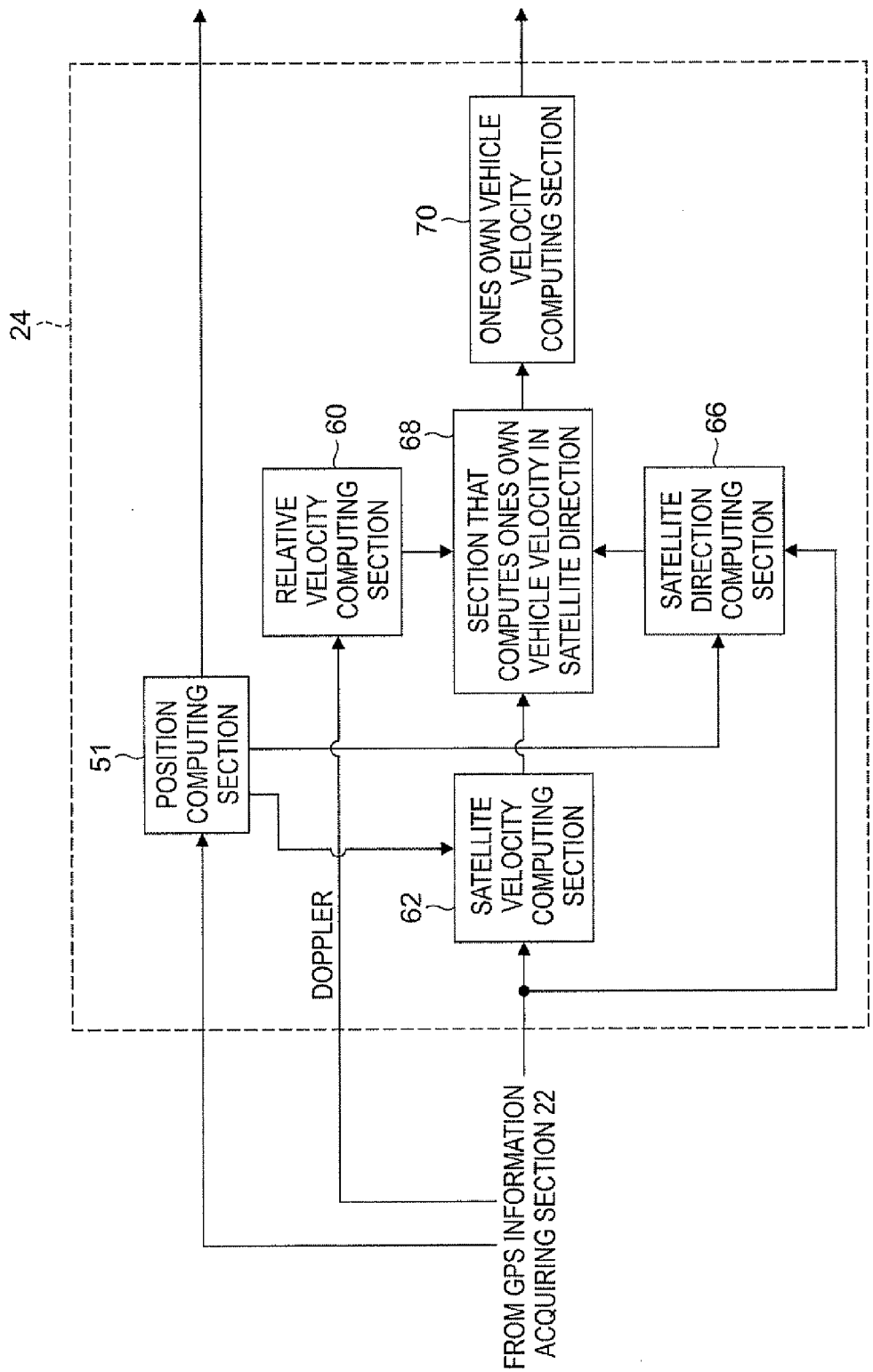

FIG.16

GPS OBSERVATION DATA

| GPS TIME INSTANT | SATELLITE NUMBER | PSEUDO DISTANCE | CARRIER WAVE PHASE | DOPPLER | S/N |
|---|---|---|---|---|---|
| t0_0 | prn0 | C0 | P0 | D0 | SN0 |
|  | prn1 | C1 | P1 | D1 | SN1 |
| ... | ... | ... | ... | ... | ... |
|  | prnN | Cn | Pn | Dn | SNn |
| t0_1 | prn0 | C0 | P0 | D0 | SN0 |
|  | prn1 | C1 | P1 | D1 | SN1 |
| ... | ... | ... | ... | ... | ... |
|  | prnN | Cn | Pn | Dn | SNn |
| ... | ... | ... | ... | ... | ... |
| t0_n | prn0 | C0 | P0 | D0 | SN0 |
|  | ... | ... | ... | ... | ... |
|  | prnN | Cn | Pn | Dn | SNn |

ORBIT INFORMATION

| IONOSPHERE CORRECTION COEFFICIENT | | | | | | | |
|---|---|---|---|---|---|---|---|
| α0 | α1 | α2 | α3 | | | | |
| β0 | β1 | β2 | β3 | | | | |

| SATELLITE NUMBER | TIME INSTANT | PARAMETER 29 | | |
|---|---|---|---|---|
| prn0 | t0_0 | p00–p029 | | |
| ... | ... | ... | | |
| prnN | t0_N | pN00–pN029 | | |

LOCAL MAP GENERATING DEVICE, LOCAL MAP GENERATING SYSTEM, GLOBAL MAP GENERATING DEVICE, GLOBAL MAP GENERATING SYSTEM, AND PROGRAM

TECHNICAL FIELD

The present invention relates to a local map generating device, a local map generating system, a global map generating device, a global map generating system, and a program, and, in particular, relates to a local map generating device, a local map generating system, a global map generating device, a global map generating system, and a program that generate a local map that records environment information of the periphery of a moving body, or a global map.

BACKGROUND ART

There is conventionally known a road surface markings map generating method that, while taking into consideration the positional offset of road surface images that arises when integrating data of plural lanes with respect to road surface images that are generated by affine transforming from measured positions and a video camera, integrates road surface images by using the path having the highest accuracy, in accordance with evaluated positional accuracy, as a reference path (Japanese Patent Application Laid-Open (JP-A) No. 2010-175756).

DISCLOSURE OF INVENTION

Technical Problems

However, the technique of aforementioned JP-A No. 2010-175756 supposes a measurement vehicle at which highly accurate positions and a highly accurate locus can be obtained in advance, and has the problem that it cannot be applied to a general vehicle. Further, with regard to the aligning of road surface marks as well, a method is used that supposes a reference path and that adjusts such that the accuracy is high, but this is possible if the vehicle is a highly accurate measurement vehicle. In a usual GPS for navigation, there is the possibility that positioning errors of several 10 m will arise within a city in particular, and even on suburban roads, there is accuracy of several m. Therefore, there is the problem that the accuracy does not improve even if an attempt is made to make the position match a reference path.

The present invention was made in order to overcome the above-described problematic points.

Solution to Problem

In order to achieve the above-described object, a local map generating device relating to a first aspect of the present invention is structured to include: an environment information acquiring section that is installed in a moving body, and that acquires environment information of a periphery of the moving body as seen from a set position; a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; a computing section that, on the basis of the satellite information acquired by the satellite information acquiring section, computes a velocity vector that includes a traveling direction of the moving body, or velocity information that expresses a velocity of the moving body and the traveling direction of the moving body; a locus computing section that integrates the velocity information of the moving body that was computed by the computing section, and computes a locus of positions of the moving body; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

A program relating to a second aspect of the present invention is a program for causing a computer to function as respective sections of a local map generating device that includes an environment information acquiring section that is installed in a moving body and that acquires environment information of a periphery of the moving body as seen from a set position, the program causing the computer to function as: a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; a computing section that, on the basis of the satellite information acquired by the satellite information acquiring section, computes a velocity vector that includes a traveling direction of the moving body, or velocity information that expresses a velocity of the moving body and the traveling direction of the moving body; a locus computing section that integrates the velocity information of the moving body that was computed by the computing section, and computes a locus of positions of the moving body; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

In accordance with the first aspect and the second aspect of the present invention, environment information of the periphery of the moving body as seen from a set position is acquired by the environment information acquiring section. Satellite information, that includes information relating to respective positions of plural GPS satellites that are transmitted from the respective GPS satellites, and information relating to distances between the respective GPS satellites and the moving body, and information relating to relative velocities of the moving body with respect to the respective GPS satellites, is acquired by the satellite information acquiring section.

Further, a velocity vector that includes a traveling direction of the moving body, or velocity information that expresses a velocity of the moving body and the traveling direction of the moving body, is computed by the computing section on the basis of the satellite information acquired by the satellite information acquiring section. By the locus computing section, the velocity information of the moving body that was computed by the computing section is integrated, and a locus of positions of the moving body is computed.

Further, the environment information, that was acquired by the environment information acquiring section for each point on the locus of positions of the moving body that was computed by the locus computing section, is recorded by the local map generating section in respective regions on a local map that includes the locus of positions of the moving body and that is determined on the basis of the traveling direction of the moving body at each point on the locus and the set position and posture of the environment information acquiring section.

In this way, the velocity information is integrated and the locus of the moving body is computed, and the environment information of the periphery, that is acquired for each point on the locus of the moving body, is recorded in respective regions on the local map. Due thereto, a highly accurate map can be generated by a simple structure.

A local map generating device relating to a third aspect of the present invention is structured to include: an environment information acquiring section that is installed in a moving body, and that acquires environment information of a periphery of the moving body as seen from a set position; a motion state detecting section that detects a motion state of the moving body; an azimuth angle estimating section that estimates an azimuth angle of a reference direction of the moving body, on the basis of the motion state of the moving body detected by the motion state detecting section; a locus computing section that integrates the motion state of the moving body detected by the motion state detecting section, and computes a locus of positions of the moving body on the basis of the integrated motion state of the moving body and the azimuth angle estimated by the azimuth angle estimating section; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

A program relating to a fourth aspect of the present invention is a program for causing a computer to function as respective sections of a local map generating device that includes an environment information acquiring section that is installed in a moving body and that acquires environment information of a periphery of the moving body as seen from a set position, the program causing the computer to function as: an azimuth angle estimating section that estimates an azimuth angle of a reference direction of the moving body, on the basis of a motion state of the moving body that is detected by a motion state detecting section that detects a motion state of the moving body; a locus computing section that integrates the motion state of the moving body detected by the motion state detecting section, and computes a locus of positions of the moving body on the basis of the integrated motion state of the moving body and the azimuth angle estimated by the azimuth angle estimating section; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

In accordance with the third aspect and the fourth aspect of the present invention, environment information of the periphery of the moving body as seen from a set position is acquired by the environment information acquiring section. The motion state of the moving body is detected by the motion state detecting section.

Further, an azimuth angle of a reference direction of the moving body is estimated by the azimuth angle estimating section on the basis of the motion state of the moving body detected by the motion state detecting section. By the locus computing section, the motion state of the moving body that was detected by the motion state detecting section is integrated, and a locus of positions of the moving body is computed on the basis of the integrated motion state of the moving body and the azimuth angle estimated by the azimuth angle estimating section.

Further, the environment information, that was acquired by the environment information acquiring section for each point on the locus of positions of the moving body that was computed by the locus computing section, is recorded by the local map generating section in respective regions on a local map that includes the locus of positions of the moving body and that is determined on the basis of the traveling direction of the moving body at each point on the locus and the set position and posture of the environment information acquiring section.

In this way, the azimuth angle of the moving body is estimated and the motion state is integrated and the locus of the moving body is computed, and the environment information of the periphery, that is acquired for each point on the locus of the moving body, is recorded in respective regions on the local map. Due thereto, a highly accurate map can be generated by a simple structure.

A global map generating device relating to a fifth aspect of the present invention is structured to include: the above-described local map generating device; local map storing means that stores a plurality of the generated local maps; merging means that, between a plurality of local maps, collates the environment information that is recorded in the local maps, and merges the plurality of local maps in a state in which the environment information has been collated; position estimating means that estimates an absolute position of at least one point on the locus of the plurality of local maps that were merged by the merging means; and global map generating means that, on the basis of the absolute position estimated by the position estimating means, records the plurality of local maps, that were merged by the merging means, on a global map that is expressed by an absolute coordinate system.

In accordance with the fifth aspect of the present invention, local maps are generated by the local map generating device, and the local map storing means stores the generated plural local maps.

Further, by the merging means, the environment information that is recorded in local maps is collated between the plural local maps, and the plural local maps are merged in a state in which the environment information has been collated. An absolute position of at least one point on the locus of the plural local maps, that were merged by the merging means, is estimated by the position estimating means.

Then, the plural local maps, that were merged by the merging means, are recorded on a global map, that is expressed by an absolute coordinate system, by the global map generating means on the basis of the absolute position estimated by the position estimating means.

In this way, highly accurate local maps are generated, the environment information recorded in local maps is collated, plural local maps are merged, and the merged plural local maps are recorded on a global map that is expressed by an absolute coordinate system. Due thereto, a highly accurate global map can be generated by a simple structure.

A global map generating device relating to a sixth aspect of the present invention comprises: the above-described local map generating device that includes the satellite information acquiring means; local map storing means that stores the generated local map; merging means that, between a plurality of local maps, collates the environment information that is recorded in the local maps, and merges the plurality of local maps in a state in which the environment information has been collated; position estimating means that estimates an absolute position of at least one point on the locus of the plurality of local maps that were merged by the merging means; and global map generating means that, on the basis of the absolute position estimated by the position estimating means, records the plurality of local maps, that were merged by the merging means, on a global map that is expressed by an absolute coordinate system, wherein the local map generating means records, in the local map, the satellite information that was acquired by the satellite information acquiring means, for the at least one point on the locus of positions of the moving body computed by the locus computing means, and the position estimating means estimates the absolute position of the at least one point on the locus of the plurality of merged local maps, on the basis of a relative position between the at least one point of each of the plurality of local maps which relative position is determined on the basis of results of collation of the plurality of local maps, and the satellite information recorded in each of the plurality of local maps.

In accordance with the sixth aspect of the present invention, local maps are generated by the local map generating device, and the local map storing means stores the generated plural local maps. At this time, the local map generating means records, in the local map, satellite information that was acquired by the satellite information acquiring means for at least one point on the locus of positions of the moving body that was computed by the locus computing means.

Then, by the merging means, environment information that is recorded in local maps is collated between the plural local maps, and the plural local maps are merged in a state in which the environment information has been collated. The absolute position of at least one point on the locus of the plural merged local maps is estimated by the position estimating means on the basis of the relative position of the at least one point of each of the plural local maps which relative position is determined on the basis of the results of collation of the plural local maps, and the satellite information recorded in each of the plural local maps.

Then, the plural local maps, that were merged by the merging means, are recorded on a global map, that is expressed by an absolute coordinate system, by the global map generating means on the basis of the absolute position estimated by the position estimating means.

In this way, highly accurate local maps are generated, the environment information recorded in local maps is collated, plural local maps are merged, and the merged plural local maps are recorded on a global map that is expressed by an absolute coordinate system. Due thereto, a highly accurate global map can be generated by a simple structure.

Note that the computer-readable medium that stores the program of the present invention is not particularly limited, and may be a hard disk or may be a ROM. Further, the medium may be a CD-ROM or a DVD disk, or a magneto-optical disk or an IC card. Still further, this program may be downloaded from a server or the like that is connected to a network.

Advantageous Effects of Invention

As described above, the local map generating device and program that are aspects of the present invention integrate velocity information, or estimate the azimuth angle of a moving body and integrate the motion state, and compute the locus of the moving body, and record, in respective regions on a local map, environment information of the periphery that is acquired for each point on the locus of the moving body. Due thereto, the effect of being able to generate a highly accurate map by a simple structure is obtained.

Further, in accordance with the global map generating device of the present invention, highly accurate local maps are generated, the environment information recorded in the local maps is collated and plural local maps are merged, and the merged plural local maps are recorded on a global map that is expressed by an absolute coordinate system. Due thereto, the effect of being able to generate a highly accurate global map by a simple structure is obtained.

BRIEF DESCRIPTION OF DRAWINGS

FIG. 1 is block drawing showing a local map generating device relating to a first embodiment.

FIG. 3 is a block drawing showing a position/velocity vector computing section of the local map generating device relating to the first embodiment of the present invention.

FIG. 16 is a drawing showing examples of GPS information.

BEST MODES FOR CARRYING OUT THE INVENTION

Figure 2B:
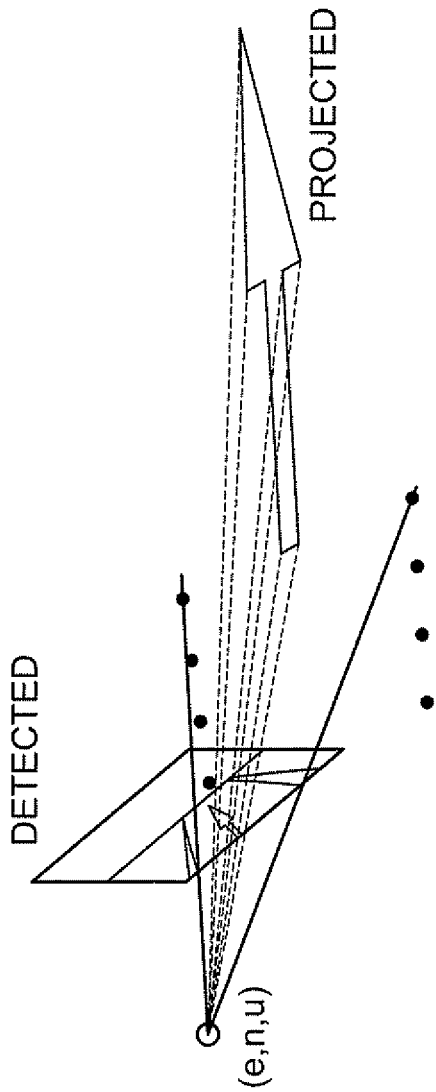
FIG. 2B is a drawing showing a state in which a forward image is projected on a road surface.

Embodiments of the present invention are described in detail hereinafter with reference to the drawings. Note that the first embodiment describes, as an example, a case in which the present invention is applied to a local map generating device that is installed in a vehicle, and that acquires GPS information emitted from GPS satellites, and that generates a local map that records images of the periphery of owns one vehicle.

As shown in FIG. 1, a local map generating device 10 relating to the first embodiment has a GPS receiving section 12 that receives radio waves from GPS satellites, an image pickup device 14 that picks-up images of the region in front of ones own vehicle, and a computer 20 that, on the basis of received signals from GPS satellites that are received by the GPS receiving section 12 and the forward images that are picked-up by the image pickup device 14, generates a local map that is expressed by a coordinate system whose origin is the position of ones own vehicle, and outputs local maps of the periphery, that were generated in the past, to a driving support device 18. Note that the image pickup device 14 is an example of the environment information acquiring section.

The GPS receiving section 12 receives radio waves from plural GPS satellites, and acquires information of the GPS satellites from the received signals that are received from all of the GPS satellites, and outputs the information to the computer 20.

Figure 2A:
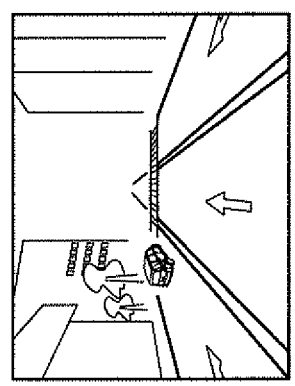
FIG. 2A is a drawing showing an example of a forward image.

The image pickup device 14 repeatedly picks-up a forward image such as shown in FIG. 2A, and outputs the images to the computer 20.

On the basis of an inputted local map, the driving support device 18 acquires the positional relationship with an object of control that is ahead, and carries out driving support such as warning of a curve or temporarily assisting stopping or the like.

The computer 20 is structured by a CPU, a ROM that stores a program for realizing a local map generating processing routine that is described later, a RAM that stores data temporarily, and a storage device such as an HDD or the like.

The computer 20 is expressed by function blocks in accordance with the local map generating processing routine that is described hereinafter. As shown in FIG. 1, the computer 20 has a GPS information acquiring section 22 that acquires, from the GPS receiving section 12, the information of the GPS satellites of all of the GPS satellites from which radio waves are received, and computes and acquires GPS pseudo distance data, Doppler frequencies, and positional coordinates of the GPS satellites, a position/velocity vector computing section 24 that, on the basis of the acquired GPS information, computes the position and the velocity vector of ones own vehicle at each time instant, a locus computing section 26 that integrates the velocity vector of a computed predetermined amount of time and computes the locus of the positions of ones own vehicle in the predetermined time, an image acquiring section 28 that acquires the forward images that are picked-up at respective time instants by the image pickup device 14, a projected image generating section 30 that generates a projected image in which the acquired forward image is projected in a plane so as to become a bird's-eye view, a local map generating section 32 that generates a local map that records projected images of respective geographical points along the computed locus of the predetermined time, and a local map storage section 34 that stores the plural, generated local maps. Note that the position/velocity vector computing section 24 is an example of the computing section and the position computing section.

The GPS information acquiring section 22 acquires, from the GPS receiving section 12, the information of the GPS satellites of all of the GPS satellites from which radio waves are received, and acquires GPS pseudo distance data. Further, on the basis of already-known frequencies of signals transmitted from the respective GPS satellites and frequencies of the received signals that are received from the respective GPS satellites, the GPS information acquiring section 22 computes the respective Doppler frequencies of the received signals from the respective GPS satellites. Note that the Doppler frequency is a frequency in which the Doppler shift amount of the carrier wave frequency due to the relative velocity between the GPS satellite and ones own vehicle is observed.

The position/velocity vector computing section 24 can be expressed as a structure that, as shown in FIG. 3, includes a position computing section 51 that computes the positions of the GPS satellites and the position of ones own vehicle on the basis of the acquired GPS information, a relative velocity computing section 60 that, on the basis of the acquired Doppler frequencies of the respective GPS satellites, computes the relative velocity of ones own vehicle with respect to each of the GPS satellites, a satellite velocity computing section 62 that, on the basis of acquired time sequence data of the positional coordinates of each GPS satellite, computes a velocity vector of each GPS satellite, a satellite direction computing section 66 that, on the basis of the computed position of ones own vehicle and the positional coordinates of each of the GPS satellites, computes the direction (the relationship of the angle) of each GPS satellite, a section 68 that computes ones own vehicle velocity in the satellite direction that computes the velocity of ones own vehicle in each GPS satellite direction on the basis of the computed relative velocities, the velocity vector of each GPS satellite and the direction of each GPS satellite, and a ones own vehicle velocity computing section 70 that computes the velocity vector of ones own vehicle on the basis of the computed velocities of ones own vehicle in the respective plural GPS satellite directions.

The position computing section 51 computes the respective positional coordinates of the GPS satellites on the basis of orbit information of the GPS satellites and the time instants that the GPS satellites transmit radio waves.

Further, as described hereinafter, the position computing section 51 computes the position of ones own vehicle by using the GPS pseudo distance data of the respective GPS satellites acquired by the GPS information acquiring section 22.

In positioning using GPS, the position of ones own vehicle is estimated in accordance with the principles of triangulation, on the basis of the positional coordinates of GPS satellites that are already known, and pseudo distances that are the propagation distances of the received signals that are received from the respective GPS satellites.

Here, actual distance $r_j$ to a GPS satellite is expressed by following formula (1), and pseudo distance $\rho_j$ that is observed by GPS is expressed by following formula (2).

[Mathematical Expression 1]

$$r_j = \sqrt{(X_j-x)^2+(Y_j-y)^2+(Z_j-z)^2} \quad (1)$$

$$\rho_j = r_j + s \quad (2)$$

Here, $(X_j, Y_j, Z_j)$ are the positional coordinates of GPS satellite j, and $(x, y, z)$ are the positional coordinates of ones own vehicle. s is the distance error due to the timepiece error of the GPS receiving section 12.

The position $(x, y, z)$ of ones own vehicle is computed by solving the simultaneous equations of following formula (3) that are obtained from GPS pseudo distance data of four or more GPS satellites, from above formula (1) and formula (2).

[Mathematical Expression 2]

$$\begin{cases} \rho_1 = \sqrt{(X_1-x)^2+(Y_1-y)^2+(Z_1-z)^2} + s \\ \rho_2 = \sqrt{(X_2-x)^2+(Y_2-y)^2+(Z_2-z)^2} + s \\ \vdots \\ \rho_N = \sqrt{(X_N-x)^2+(Y_N-y)^2+(Z_N-z)^2} + s \end{cases} \quad (3)$$

The relative velocity computing section 60 computes the relative velocities of ones own vehicle with respect to the respective GPS satellites, from the Doppler frequencies of the received signals from the respective GPS satellites, in accordance with following formula (4) that expresses the relationship between the Doppler frequency and the relative velocity with respect to the GPS satellite.

[Mathematical Expression 3]

$$v_j = -D1_j \cdot C/F_1 \quad (4)$$

Here, $v_j$ is the relative velocity with respect to GPS satellite j, and $D1_j$ is the Doppler frequency (Doppler shift amount) obtained from the GPS satellite j. Further, C is the speed of light, and $F_1$ is the known L1 frequency of the signal transmitted from the GPS satellite.

The satellite velocity computing section 62 computes the velocity vector (three-dimensional velocities $VX_j, VY_j, VZ_j$) of each GPS satellite, by using differentiation of Kepler's equation, from the time sequence data of the obtained positional coordinates of each GPS satellite. For example, the velocity vector of each GPS satellite can be computed by using the method put forth in a non-patent document (original by Pratap Misra and Per Enge, translation by the GPS Society of Japan Institute of Navigation: "Rigorous Discussion of GPS Basic Concepts/Principles of Positioning/Signals and Receivers", Shoyo Bunko, 2004).

On the basis of the computed position of ones one vehicle and the positional coordinates of each GPS satellite, the satellite direction computing section 66 computes, as the direction of each GPS satellite, the angular relationship between the position of each GPS satellite j and the position of ones own vehicle (elevation angle $\theta_j$ with respect to the horizontal direction, and azimuth angle $\phi_j$ with respect to the northern direction).

On the basis of the computed relative velocity $v_j$ of ones own vehicle with respect to the respective GPS satellites, and the velocity vector $(VX_j, VY_j, VZ_j)$ of each of the GPS satellites, and the direction $Rj(\theta_j, \phi_j)$ of each of the GPS satellites, the section 68 that computes ones own vehicle velocity in the satellite direction computes velocity $Vv_j$ of ones own vehicle in the direction of each GPS satellite j in accordance with following formula (5).

[Mathematical Expression 4]

$$\begin{aligned} v_j &= \frac{\partial \rho_j}{\partial t} \quad (5) \\ &= \frac{\partial \left(\sqrt{(X_j-x)^2+(Y_j-y)^2+(Z_j-z)^2}+s\right)}{\partial t} \\ &= V_{sj} - V_{vj} + vCb \end{aligned}$$

$v_j$ is the relative velocity of ones own vehicle with respect to the GPS satellite j (the relative velocity with the GPS satellite in the satellite direction). Further, $Vs_j$ is the velocity of the GPS satellite j in the ones own vehicle direction, and is determined from $Vs_j = R_j[VX_j, VY_j, VZ_j]^T$. Further $Vv_j$ is ones own vehicle velocity in the direction of GPS satellite j, and vCb is the clock bias change.

As described above, ones own vehicle velocity in the GPS satellite direction is computed only in accordance with the azimuth orientation relationship with the GPS satellite, and not the three-dimensional position of the GPS satellite position. The GPS satellite is far away and circles the earth approximately twice in one day, and therefore, the change in the angle during one minute is 0.5°. Usually, the timepiece error between a GPS satellite and a GPS receiver is usually less than or equal to 1 msec, and therefore, does not greatly affect the azimuth orientation relationship with the GPS satellite. Further, similarly, because the GPS satellite is far away, even if an error of around several 100 m arises in the determining of the position of ones own vehicle, there is no great affect on the azimuth orientation relationship with the GPS satellite. Therefore, even in a situation in which it is easy for an error to arise in the pseudo distance, ones own vehicle velocity in the GPS satellite direction can be computed relatively exactly.

The ones own vehicle velocity computing section 70 carries out optimal estimation of the velocity vector of ones own vehicle as described hereinafter.

First, given that the velocity vector of ones own vehicle is (Vx, Vy, Vz), the relationship with the velocity $Vv_j$ of ones own vehicle in the GPS satellite direction is expressed by following formula (6).

[Mathematical Expression 5]

$-Vx \cdot \cos\theta_j \cdot \sin\phi_j + Vy \cdot \cos\theta_j \cdot \cos\phi_j + Vz \cdot \sin\theta_j = Vv_j$ $v_j = -D_{1j} \cdot C/F_1 = Vs_j Vv_j - Vv_j + vCb$ $$Vv_j - vCb = Vs_j + D_{1j} \cdot C/F_1 \qquad (6)$$

The simultaneous equations expressed by following formula (7), in which Vx, Vy, Vz and Cb are estimated values, are obtained from above formula (6) that is obtained for each GPS satellite j.

[Mathematical Expression 6]

$$\begin{pmatrix} Vs_0 + D1_0 \cdot C/F1 \\ Vs_1 + D1_1 \cdot C/F1 \\ \vdots \\ Vs_N + D1_N \cdot C/F1 \end{pmatrix} = \qquad (7)$$

$$\begin{pmatrix} -\cos\theta_0\sin\phi_0 & \cos\theta_0\cos\phi_0 & \sin\theta_0 & -1 \\ -\cos\theta_1\sin\phi_1 & \cos\theta_1\cos\phi_1 & \sin\theta_1 & -1 \\ \vdots & \vdots & \vdots & \vdots \\ -\cos\theta_N\sin\phi_N & \cos\theta_N\cos\phi_N & \sin\theta_N & -1 \end{pmatrix} \cdot \begin{pmatrix} Vx \\ Vy \\ Vz \\ vCb \end{pmatrix}$$

In a case in which there are four or more GPS satellites from which radio waves are received, the optimal value of the velocity vector (Vx, Vy, Vz) of ones own vehicle is computed by solving the simultaneous equations of above formula (7).

The locus computing section 26 integrates the velocity vectors of ones own vehicle of the computed predetermined amount of time, and computes the locus of the positions of ones own vehicle in this predetermined time.

The projected image generating section 30 generates a projected image in which the acquired forward image is projected onto a plane (the road surface) as shown in FIG. 2B. At this time, regions relating to road surface structures, such as road surface marks and the like, are detected, and a projected image, in which the detected road surface structure regions are projected onto the road surface, is generated. Note that the road surface structure regions may be detected after the forward image is projected onto the road surface.

Figure 4A:
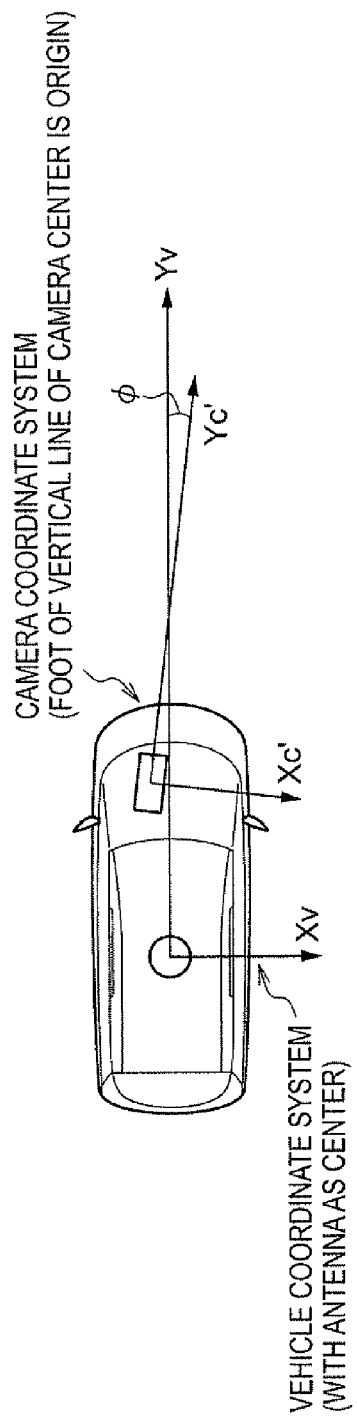
FIG. 4A is a drawing for explaining a vehicle coordinate system and a camera coordinate system.
Figure 4B:
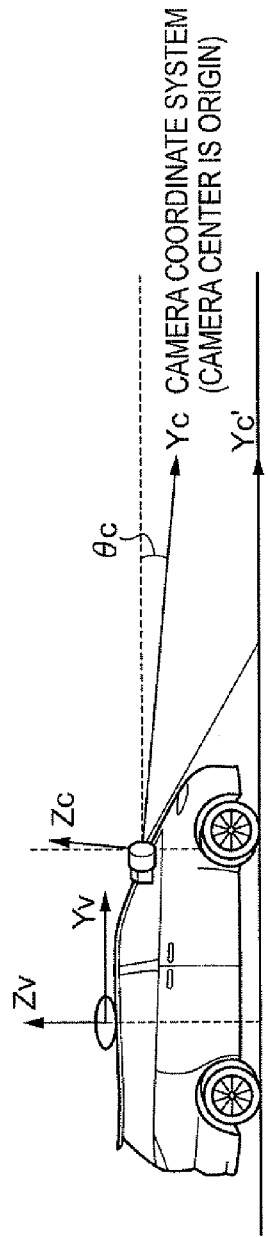
FIG. 4B is a drawing for explaining the vehicle coordinate system and the camera coordinate system.

For example, as shown in FIG. 4A and FIG. 4B, the relationship of correspondence between a vehicle coordinate system (Xv, Yv, Zv) whose center is the antenna of the GPS receiving section 12 of ones own vehicle, and a camera coordinate system (Xc', Ye', Zc') whose origin is the foot of the vertical line of the center of the image pickup device 14, is defined as per following formula (8).

[Mathematical Expression 7]

$$\begin{bmatrix} Xv \\ Yv \\ Zv \end{bmatrix} = \begin{bmatrix} \cos\phi & \sin\phi & 0 \\ -\sin\phi & \cos\phi & 0 \\ 0 & 0 & 1 \end{bmatrix} \cdot \begin{bmatrix} Xc' \\ Yc' \\ Zc' \end{bmatrix} + \begin{bmatrix} vLateral \\ vLongitudinal \\ vHeight \end{bmatrix} \qquad (8)$$

Here, vLateral, vLongitudinal, vHeight express the offset components of the origins of the vehicle coordinate system and the camera coordinate system, and φ represents the angle formed by the image pickup direction of the image pickup device 14 (an axis of the camera coordinate system) and an axis of the vehicle coordinate system (the traveling direction of ones own vehicle), in the XY plane.

Figure 5:
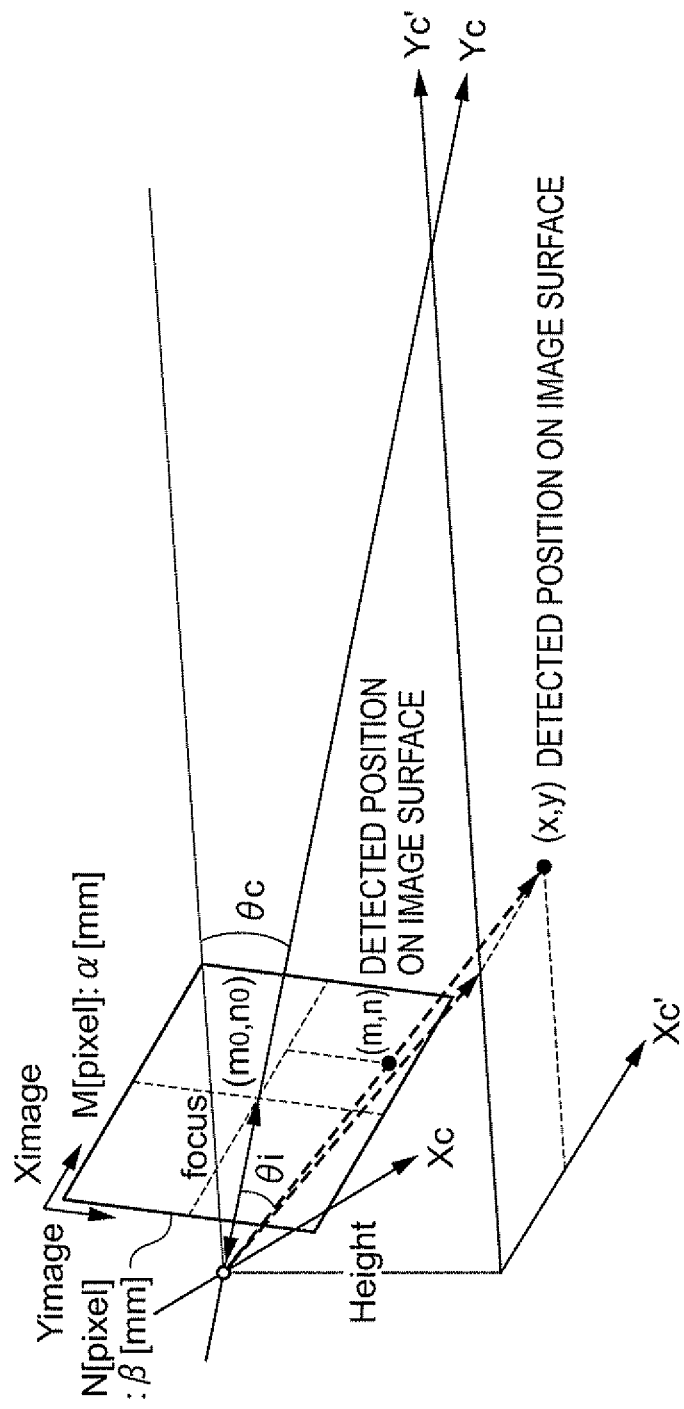
FIG. 5 is a drawing for explaining a position at a time of projecting a position on the forward image onto the road surface.

Further, as shown in FIG. 5, a projected image is generated by converting a detected position (m, n) on the forward image into a position (x, y) on the projected image as per following formula (9).

[Mathematical Expression 8]

$$y = \text{Height}/\tan(\theta c + \theta') \qquad (9)$$
$$x = \text{Height}/\sin(\theta c + \theta') \cdot \frac{\alpha \cdot (m - m_0)}{f \cdot M}$$

wherein $$\tan\theta' = \frac{\beta \cdot (n - n_0)}{f \cdot N}$$

Here, Height expresses the height of the set position of the image pickup device 14, and θc expresses the angle that is formed by the image pickup direction of the image pickup device 14 (an axis of the camera coordinate system) and an axis of the vehicle coordinate system, in the YZ plane. Further, M is the number of pixels in the lateral direction of the forward image, and α is the length [mm] in the lateral direction of the forward image. N is the number of pixels in the vertical direction of the forward image, and β is the length [mm] in the vertical direction of the forward image. ($m_0$, $n_0$) is the image pickup center on the forward image, and f is the focal length.

Figure 6:
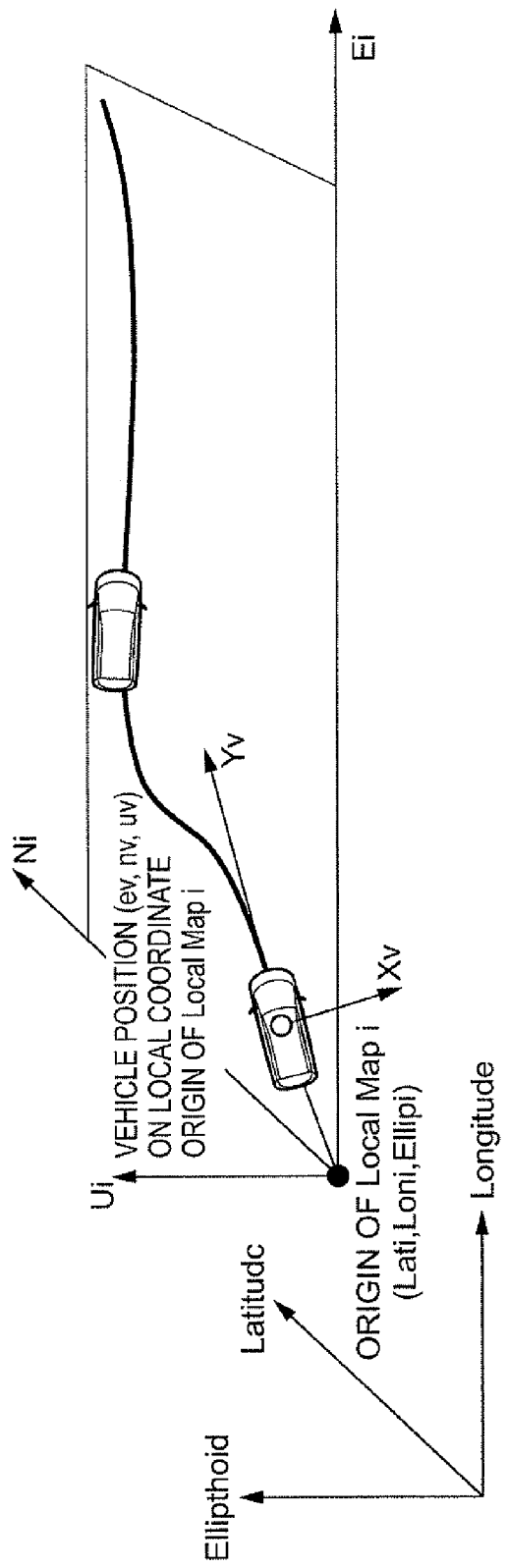
FIG. 6 is a drawing showing a state of recording projected images along a locus of ones own vehicle.

The local map generating section 32 generates a local map that records a projected image at each geographical point along the locus of the computed predetermined time, as shown in FIG. 6. Here, position (Ui, Ei, Ni) on the local map, that is on the detected image (mi, ni) at the vehicle position (ev, nv, uv) on the local map, is computed in accordance with following formula (10).

[Mathematical Expression 9]

$$\begin{bmatrix} U_i \\ E_i \\ N_i \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\psi & -\sin\psi \\ 0 & \sin\psi & \cos\psi \end{bmatrix} \qquad (10)$$

$$\begin{bmatrix} Zvi \\ Xvi \\ Yvi \end{bmatrix} + \begin{bmatrix} uv \\ ev \\ nv \end{bmatrix}$$

Here, φ is the roll angle, θ is the pitch angle, and ψ is the yaw angle (azimuth angle: the angle of the vehicle traveling direction based on the northern direction). $(Zvi, Xvi, Yvi)^T$ is the position, that projects the position (mi, ni) onto a horizontal plane, in the coordinate system that is centered on the vehicle, and is determined from above formula (8) and formula (9).

As described above, the viewpoint of the camera is acquired by highly accurate locus estimation, and, by recording road surface images along this locus, a highly accurate local map is generated. In particular, in locus estimation that uses Doppler frequencies of a GPS, it is possible to estimate the absolute azimuth orientation, and therefore, there are the features that locus estimation without drift of the azimuth angle is possible and there are also few accumulated errors.

Figure 7:
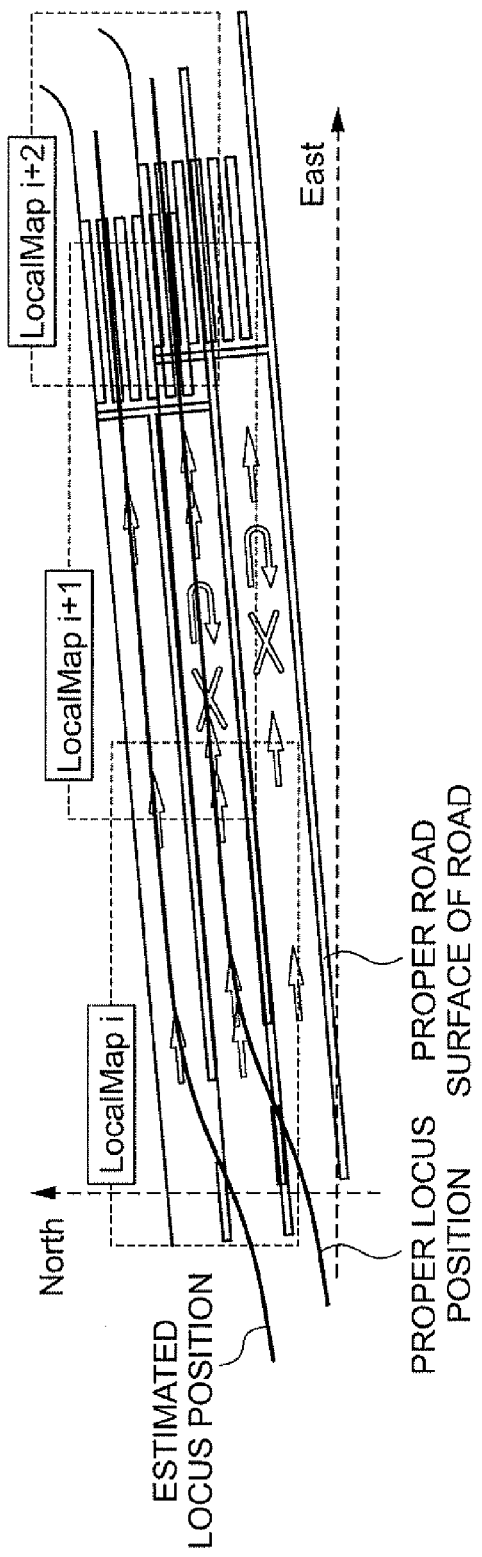
FIG. 7 is a drawing for explaining offset between an actual road surface and the projected images on local maps.

Further, the local map is generated within a range that can ensure the accuracy and the range that are needed per application (e.g., it is desired to acquire a stop line that is 50 m ahead with an accuracy of 0.3 m, or the like). The locus estimation error in the present embodiment is, for example, 0.1 to 1 m per 100 m, and, if the errors are in this range, highly accurate local map generation can be anticipated. The positional accuracy obtained at the position computing section 51 is not that high (several m to several 10 m), and there is the possibility that there will be an error in the absolute position. Therefore, there is the possibility that there will be offset between the generated local map and the actual positions of street road surface marks as shown in FIG. 7. However, because there are few accumulated errors in a given range, a local map whose relative positional accuracy is high is obtained.

Figure 8:
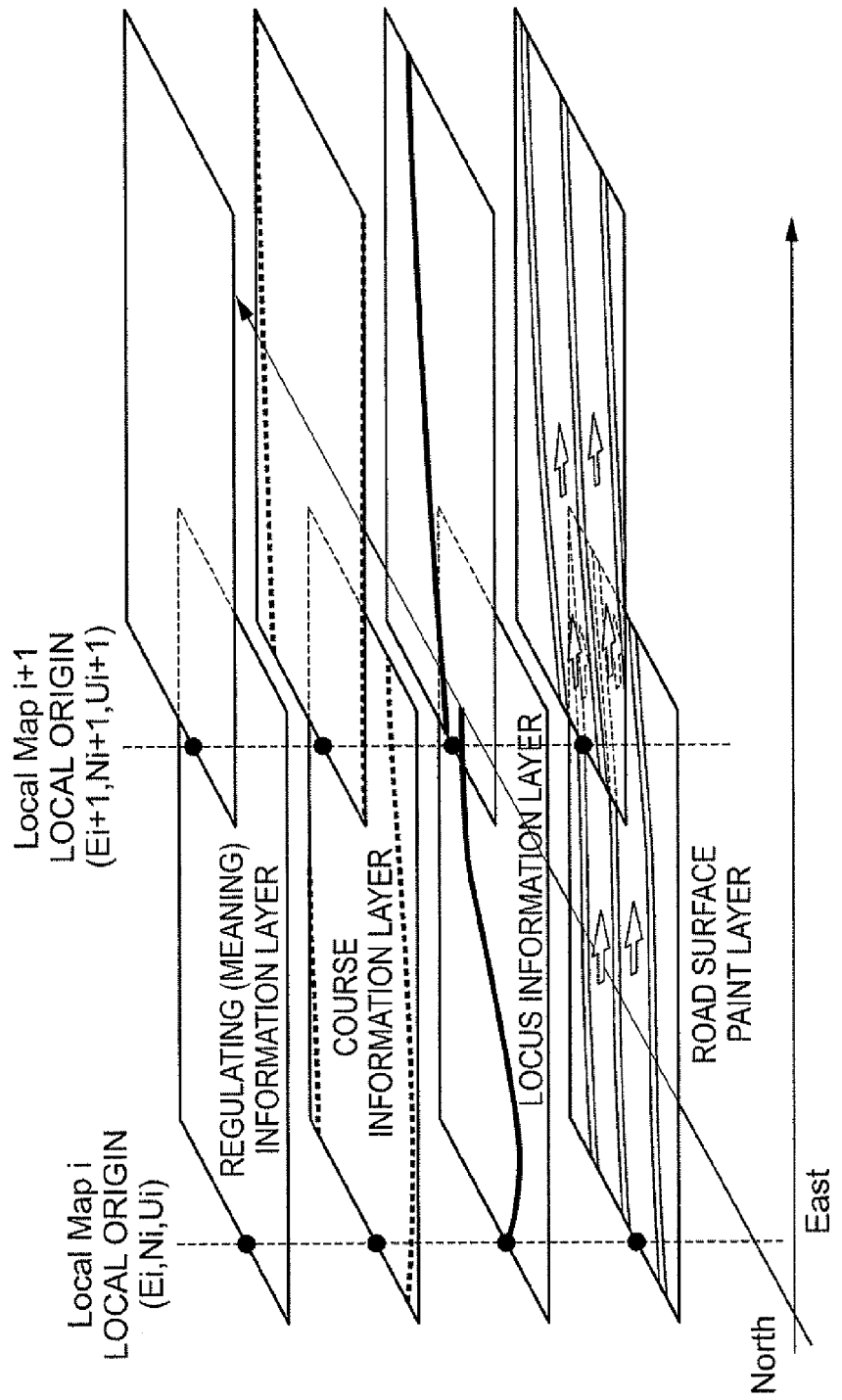
FIG. 8 is a drawing illustrating an example of the data structure of the local map.

Further, an illustrative example of the structure of the local map is shown in FIG. 8. For example, a given absolute position is made to be the base point, and a local map is generated at a locus from there. Because GPS Doppler, whose azimuth orientation estimation accuracy is high, of that time is utilized, there is the feature that the local map is not a form that follows the linear shape of a locus, and standardization in an orthogonal coordinate system is appropriate.

Further, all of the information may be expanded on a single map. As shown in above-described FIG. 8, it is desirable for information obtained from the camera image (a road surface paint layer) and information of the locus (a locus information layer) and integrated information obtained from these (a course information layer), and information to which meaning has been given (a meaning information layer or a regulating information layer), to be maintained in layers that are separated, and to be in a form in which updating of the information and improvement of the algorithms are easy. However, the way of structuring the information is not limited to the above.

Further, the local map generating section 32 further records the position (the absolute position) of ones own vehicle, that was computed by the position computing section 51 for the above-described starting point of the locus of ones own vehicle, in the local map as the origin of the local map.

The local map storage section 34 stores the plural local maps that are generated by the local map generating section 32.

The computer 20 further has a local map searching section 36 that searches for a local map that has been generated for the periphery of the current position of ones own vehicle, and a collating section 38 that collates the local map that is generated at the present point in time and a local map that has been retrieved, and outputs the results of collation and the retrieved local map to the driving support device 18.

In a case in which local maps have been generated, the local map searching section 36 searches for the local map that has been generated for the periphery of the position of ones own vehicle, from the local map storage section 34 by using, as a key, the position of ones own vehicle that was computed by the position computing section 51.

The collating section 38 carries out collation, that is based on the projected images recorded on the local maps, on the local map that is generated at the present point in time and the local map that has been retrieved, and outputs the relative position between the local maps that is based on the results of collation, and the local map that has been retrieved, to the driving support device 18. Note that, in the collation that is based on the projected images, collation may be carried out by, for example, extracting plural characteristic points from the projected images and associating the characteristic points.

Further, in the retrieving of a local map, it is not absolutely necessary to carry out collation with the local map that is currently generated, and collation may be carried out by using the projected images of each time of image pickup or a short-distance local map (a map that is in the midst of being generated).

At this time, on the basis of the inputted relative position, the driving support device 18 acquires the positions of regions relating to road surface structures on the projected images that are recorded in the local map, and, on the basis of the acquired positions and the road surface structures, carries out driving support such as warning of curves or temporarily assisting stopping or the like.

Operation of the local map generating device 10 relating to the first embodiment is described next.

Figure 9:
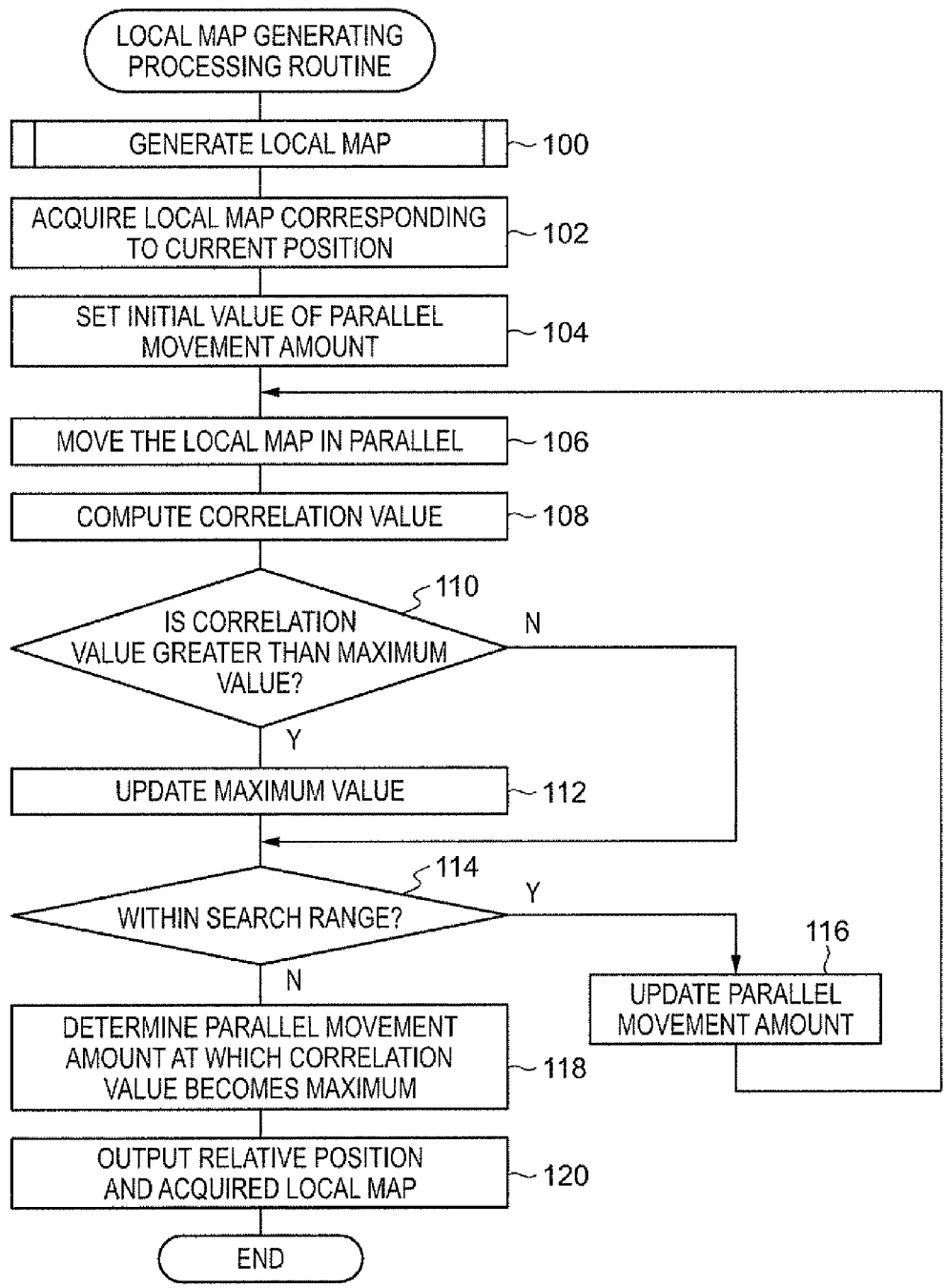
FIG. 9 is a flowchart showing the contents of a local map generating processing routine at a computer of the local map generating device relating to the first embodiment.

First, when radio waves are being repeatedly received from plural GPS satellites by the GPS receiving section 12, the local map generating processing routine shown in FIG. 9 is repeatedly executed at the computer 20.

First, in step 100, the computer 20 executes local map generating processing, and generates a local map that relates to the periphery of the locus on which ones own automobile is traveling.

Then, in step 102, by using, as a key, the position of the origin of the local map generated in above step 100 (the position of ones own vehicle that is computed in step 136 that is described later), the computer 20 searches for and acquires a local map that was generated in the periphery of that position, from the local map storage section 34.

In next step 104, the computer 20 sets the initial value of parallel movement amount $\Delta d$ ($=(\Delta ei, \Delta ni, \Delta ui)$) of the local map that was generated in above step 100. Further, the computer 20 sets the maximum value of a correlation value, that is described later, to 0 as an initial value. In step 106, the computer 20 moves the local map, that was generated in above step 100, in parallel by the parallel movement amount $\Delta d$ that was set in above step 104 or in step 116 that is described later. In step 108, the computer 20 computes the correlation value with the local map that was acquired in above step 102. In the computing of the correlation value, it suffices for the computer 20 to extract characteristic points from the projected images that are recorded in the local maps, and carry out association of the characteristic points between the local maps, and compute the correlation value on the basis of the results of the associating (e.g., the distance between characteristic points that have been associated).

Then, in step 110, the computer 20 judges whether or not the correlation value that was computed in above step 108 is greater than the maximum value of the correlation value. If the computed correlation value is less than or equal to the maximum value, the routine moves on to step 114. On the other hand, if the computed correlation value is greater than the maximum value of the correlation value, in step 112, the computer 20 updates the maximum value of the correlation value, and moves on to step 114.

In step 114, the computer 20 judges whether or not the parallel movement amount $\Delta d$ is within a predetermined search range. If the parallel movement amount $\Delta d$ is within the search range, in step 116, the computer updates the parallel movement amount $\Delta d$ to $\Delta d+\delta d$, and returns to above step 106. On the other hand, if the parallel movement amount $\Delta d$ exceeds the predetermined search range, the computer 20 moves on to step 118 and determines the parallel movement amount that is such that the correlation value becomes a maximum value.

Then, in step 120, on the basis of the parallel movement amount determined in above step 118, the computer 20 determines the relative position of the local map, that was acquired in above step 102, with respect to the current local map. The computer 20 outputs the determined relative position and the local map that was acquired in above step 102 to the driving support device 18, and ends the local map generating processing routine.

Figure 10:
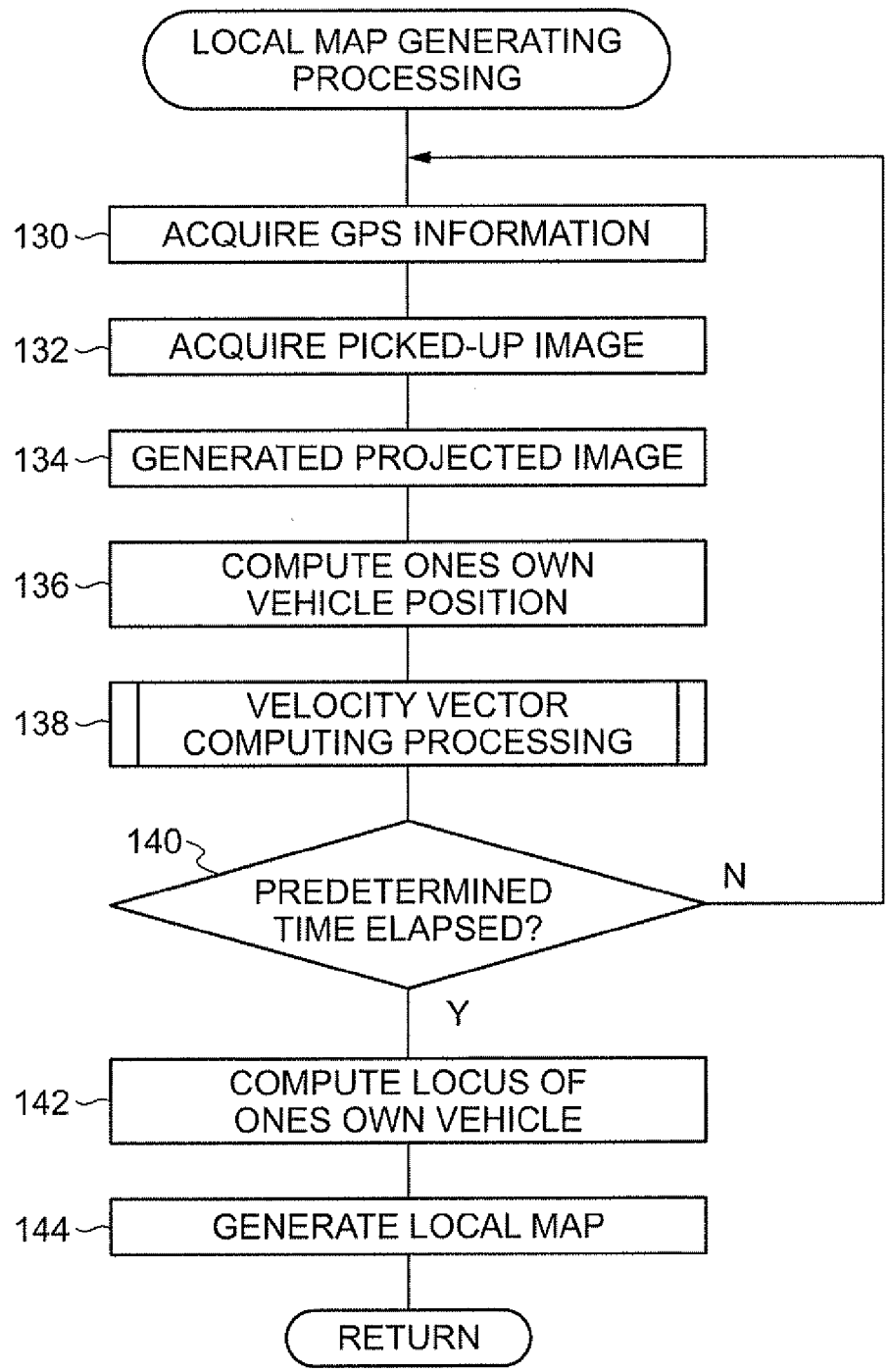
FIG. 10 is a flowchart showing the contents of local map generating processing at the computer of the local map generating device relating to the first embodiment.

Above step 100 is realized by the local map generating processing shown in FIG. 10.

First, in step 130, the computer 20 acquires information of plural GPS satellites from the GPS receiving section 12, and computes and acquires the GPS pseudo distance data of the plural GPS satellites, the Doppler frequencies, and the positional coordinates of the GPS satellites.

Then, in step 132, the computer 20 acquires the forward image that was picked-up by the image pickup device 14. In next step 134, the computer 20 generates a projected image in which the forward image, that was acquired in above step 132, is projected onto the road surface.

Then, in step 136, by using the GPS pseudo distance data of the respective GPS satellites, the computer 20 computes the position of ones own vehicle in accordance with above formulas (1) through (3).

Next, in step 138, the computer 20 executes velocity vector computing processing that is described later, and estimates the velocity vector. Then, in step 140, the computer 20 judges whether or not a predetermined time has elapsed from the start of processing. If the predetermined time has not elapsed, the computer 20 returns to above step 130. On the other hand, if the predetermined time has elapsed, the computer 20 judges that the projected images and the velocity vector of the predetermined time amount have been acquired, and proceeds to step 142.

In step 142, the computer 20 integrates the velocity vectors of the predetermined time amount that were computed in above step 138, and computes the locus of ones one vehicle. Then, in step 144, for each point of the locus along the locus of ones own vehicle that was computed in above step 142, the computer 20 records the projected image generated in above step 134, and generates a local map, and stores the local map in the local map storage section 34, and returns.

Figure 11:
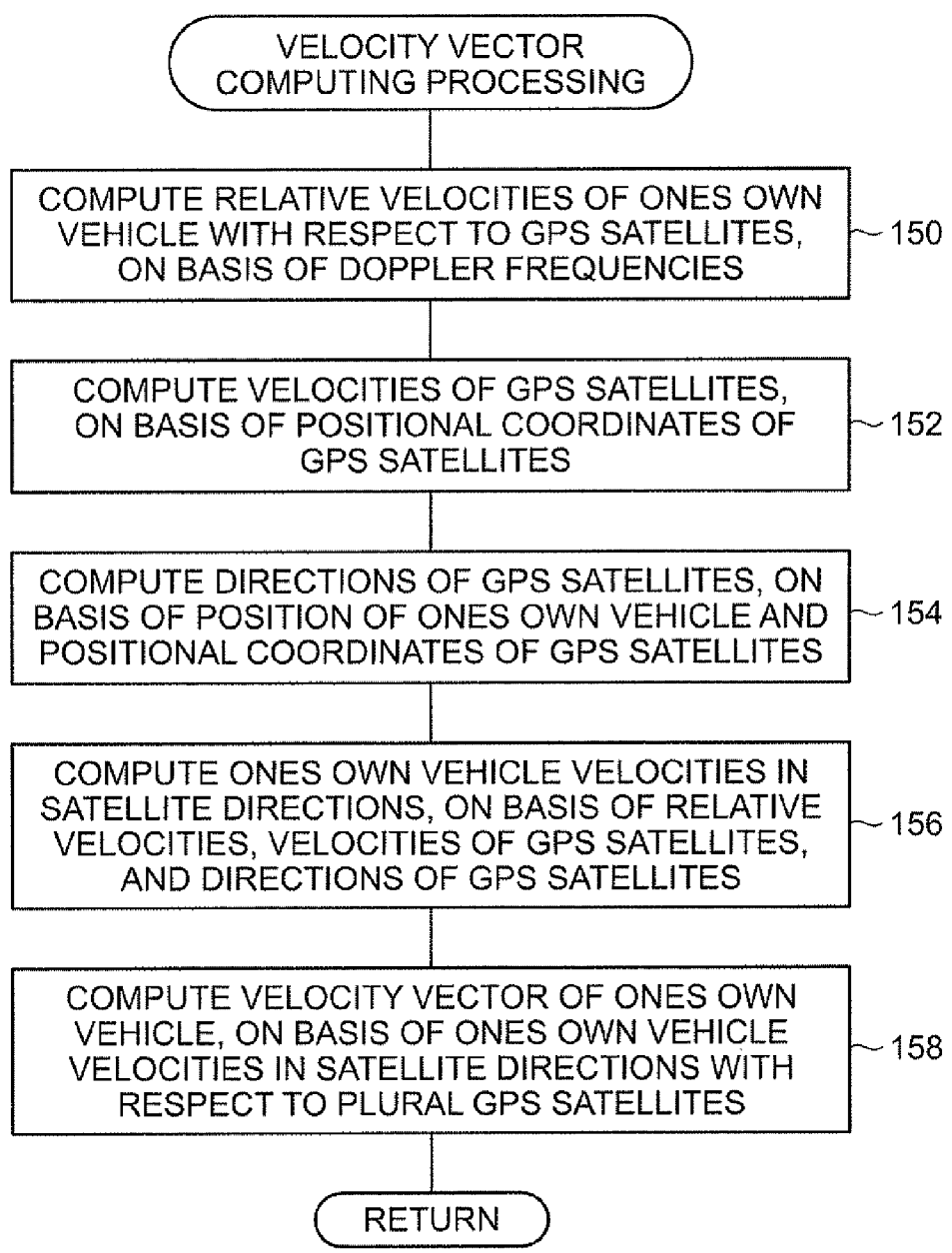
FIG. 11 is a flowchart showing the contents of velocity vector computing processing at the computer of the local map generating device relating to the first embodiment.

Further, above step 138 is realized by the velocity vector computing processing shown in FIG. 11.

In step 150, the computer 20 computes the relative velocity $v_j$ of ones own vehicle with respect to each GPS satellite, from the Doppler frequencies of the received signals from the respective GPS satellites and in accordance with above formula (4).

Next, in step 152, the computer 20 computes the velocity vector $(VX_j, VY_j, VZ_j)$ of each GPS satellite by using differentiation of Kepler's equation, from the time sequence data of the acquired positional coordinates of each GPS satellite.

Next, in step 154, on the basis of the position of ones own vehicle computed in above step 136 and the positional coordinates of each GPS satellite that were acquired in above step 130, the computer 20 computes, as the direction of each GPS satellite, the angular relationship $R_j$ (elevation angle $\theta_j$ with respect to the horizontal direction, and azimuth angle $\phi_j$ with respect to the northern direction) between the position of each GPS satellite j and the position of ones own vehicle.

Next, in step 156, the computer 20 computes the velocity $Vv_j$ of ones own vehicle in the direction of each GPS satellite j, in accordance with above formula (5) and on the basis of the relative velocity $v_j$ of ones own vehicle with respect to each GPS satellite that was computed in above step 150, and the velocity vector $V_j (VX_j, VY_j, VZ_j)$ of each GPS satellite that was computed in above step 152, and the directions $R_j(\theta_j, \phi_j)$ of each GPS satellite that were computed in above step 154. The velocity $Vs_j$ of the GPS satellite j in the direction of ones own vehicle in formula (5) is computed from $Vs_j = R_j[VX_j, VY_j, VZ_j]^T$.

Next, in step 158, the computer 20 computes the optimal value of the velocity vector (Vx, Vy, Vz) of ones own vehicle in accordance with above formula (6) and formula (7), and returns.

As described above, in the local map generating device relating to the first embodiment, velocity vectors that are computed by using Doppler frequencies are integrated, the locus of ones own vehicle is computed, and road surface projected images that are acquired for the respective points on the locus of ones own vehicle are recorded at respective regions on a local map. Due thereto, the local map generating device can, by a simple structure, generate a local map that is highly accurate.

Further, because the local map generating device has the feature of utilizing a highly accurate locus, the cumulative error of the locus within a given range is small. By recording road surface structure information that is detected along the highly accurate locus, the accuracy of the relative positional relationships among the information becomes high. Therefore, even if the absolute positional accuracy is not correct, the local map accuracy can be ensured, and thus, the information of the map can be utilized effectively within the local map, and appropriate driving support can be carried out.

A local map generating device relating to a second embodiment is described next. Note that portions having similar structures as the first embodiment are denoted by the same reference numerals, and description thereof is omitted.

The second embodiment differs from the first embodiment with regard to the point that the local map generating device generates a local map without using GPS information.

Figure 12:
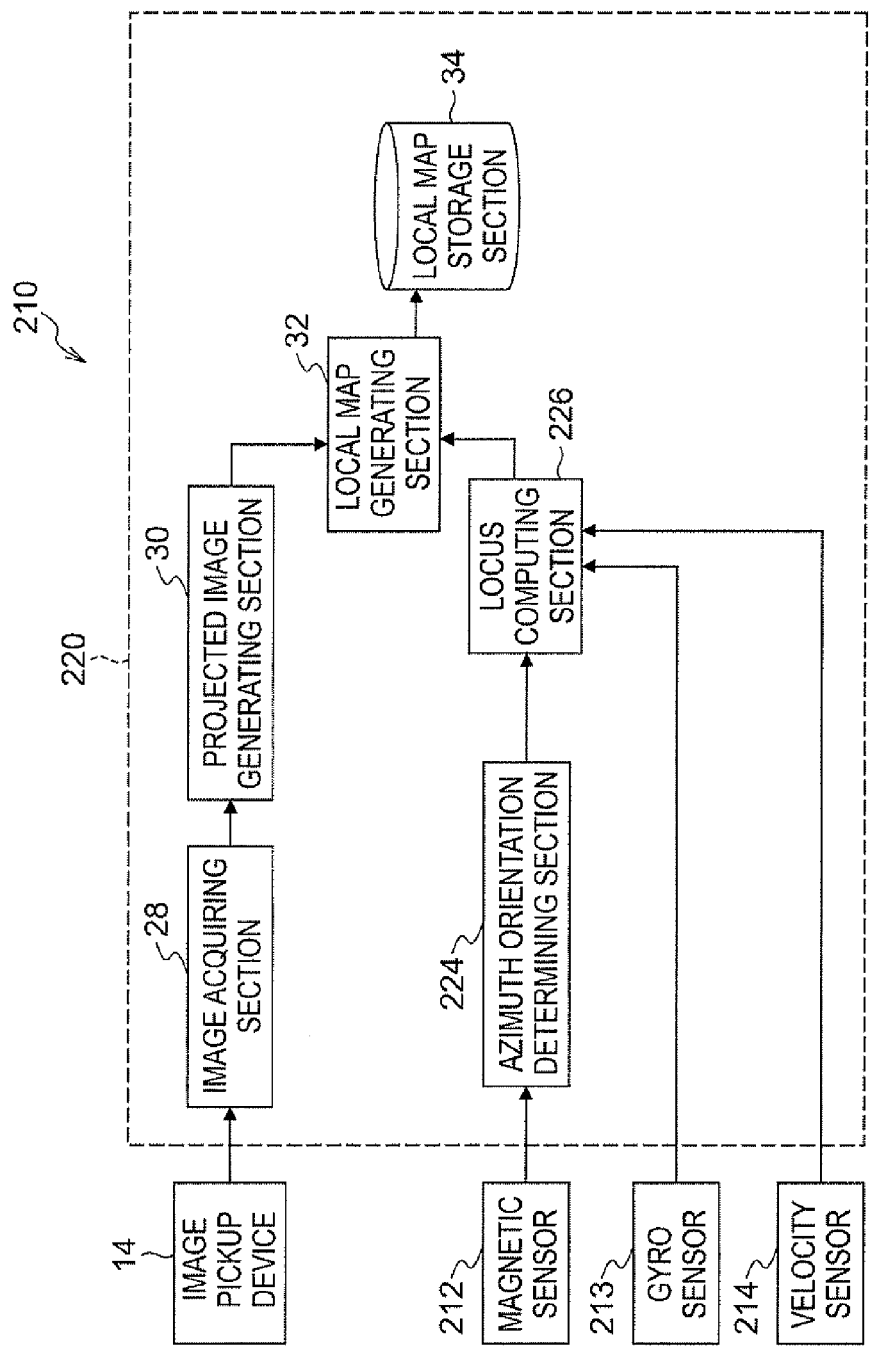
FIG. 12 is a block drawing showing a local map generating device relating to a second embodiment.

As shown in FIG. 12, a local map generating device 210 relating to the second embodiment has the image pickup device 14, a magnetic sensor 212 that detects the azimuth angle of the traveling direction of ones own vehicle, a gyro sensor 213 that detects the yaw rate of ones own vehicle, a velocity sensor 214 that detects the velocity of ones own vehicle, and a computer 220 that generates a local map on the basis of the respective detected values of the magnetic sensor 212, the gyro sensor 213 and the velocity sensor 214, and the forward images that are picked-up by the image pickup device 14. Note that the magnetic sensor 212, the gyro sensor 213 and the velocity sensor 214 are examples of the motion state detecting sections.

The computer 220 has an azimuth orientation determining section 224 that determines the azimuth angle of the traveling direction of ones own vehicle on the basis of the detected value of the magnetic sensor 212, a locus computing section 226 that computes the locus of ones own vehicle in a predetermined time on the basis of the determined azimuth angle, the detected value from the gyro sensor 213 and the detected value from the velocity sensor 214, and the image acquiring section 28, the projected image generating section 30, the local map generating section 32, and the local map storage section 34.

The locus computing section 226 integrates the yaw rate of a predetermined amount of time that was detected by the gyro sensor 213, and the velocity of a predetermined amount of time that was detected by the velocity sensor 214. The locus computing section 226 computes the locus of the positions of ones own vehicle in this predetermined time on the basis of the results of integration and the azimuth angle of the traveling direction that was determined by the azimuth orientation determining section 224.

Figure 13:
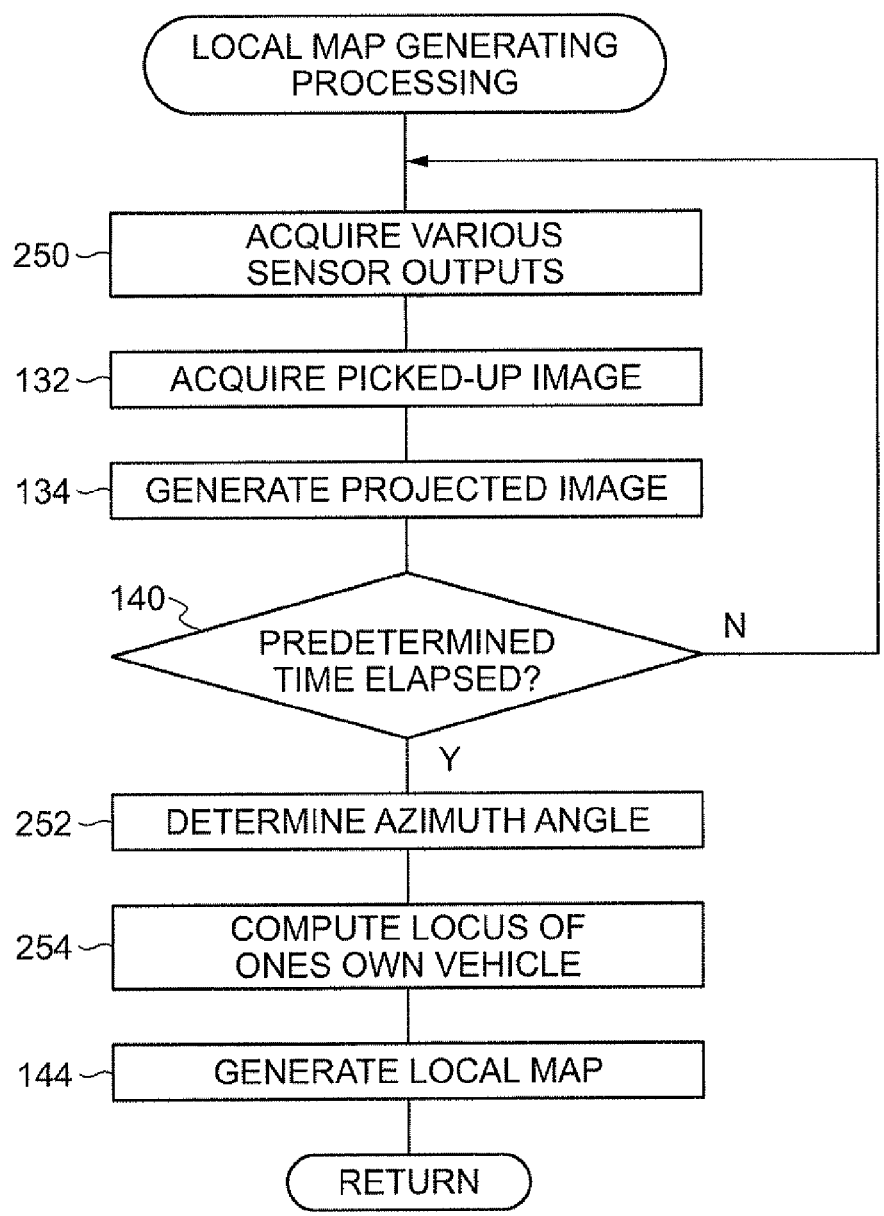
FIG. 13 is a flowchart showing the contents of local map generating processing at a computer of the local map generating device relating to the second embodiment.

The local map generating processing in the second embodiment is described next with reference to FIG. 13. Note that processings that are similar to the first embodiment are denoted by the same reference numerals, and description thereof is omitted.

First, in step 250, the computer 220 acquires the sensor outputs from the magnetic sensor 212, the gyro sensor 213, and the velocity sensor 214, respectively. Then, in step 132, the computer 220 acquires the forward image that was picked-up by the image pickup device 14. In next step 134, the computer 220 generates a projected image in which the forward image, that was acquired in above step 132, is projected onto the road surface.

Then, in step 140, the computer 220 judges whether or not a predetermined time has elapsed from the start of processing. If the predetermined time has not elapsed, the computer 220 returns to above step 250. On the other hand, if the predetermined time has elapsed, the computer 220 judges that the projected images and the sensor outputs of the predetermined amount of time have been acquired, and proceeds to step 252.

In step 252, on the basis of the output of the magnetic sensor 212 that was acquired in above step 250, the computer 220 determines the azimuth angle of the traveling direction of ones own vehicle at the starting point of the locus that is computed in step 254 that is described hereafter.

Then, in step 254, the computer 220 computes the locus of ones own vehicle on the basis of the outputs of the gyro sensor 213 and the velocity sensor 214 for the predetermined amount of time that were acquired in above step 250, and the azimuth angle that was determined in above step 252. Then, in step 144, for each point of the locus along the locus of ones own vehicle that was computed in above step 142, the computer 220 records the projected image that was generated in above step 134, and generates a local map, and stores the local map in the local map storage section 34, and returns.

Note that the other structures and operations of the local map generating device relating to the second embodiment are similar to those of the first embodiment, and therefore, description thereof is omitted.

As described above, the local map generating device relating to the second embodiment estimates the azimuth angle of ones own vehicle from the magnetic sensor, and integrates the yaw rate and the velocity that are detected by the gyro sensor and the velocity sensor, and computes the locus of ones own vehicle. The local map generating device records, at the respective regions on the local map, the road surface projected images that are acquired at the respective points on the locus of ones own vehicle. Due thereto, the local map generating device can, by a simple structure, generate a highly accurate local map.

A local map generating device relating to a third embodiment is described next. Note that portions that are structured similarly to the first embodiment are denoted by the same reference numerals, and description thereof is omitted.

In a third embodiment, the local map generating device differs from the first embodiment with regard to the point of combining a velocity vector computed from GPS information, and the sensor outputs from a magnetic sensor, a gyro sensor and a velocity sensor, and computing the locus of ones own vehicle.

Figure 14:
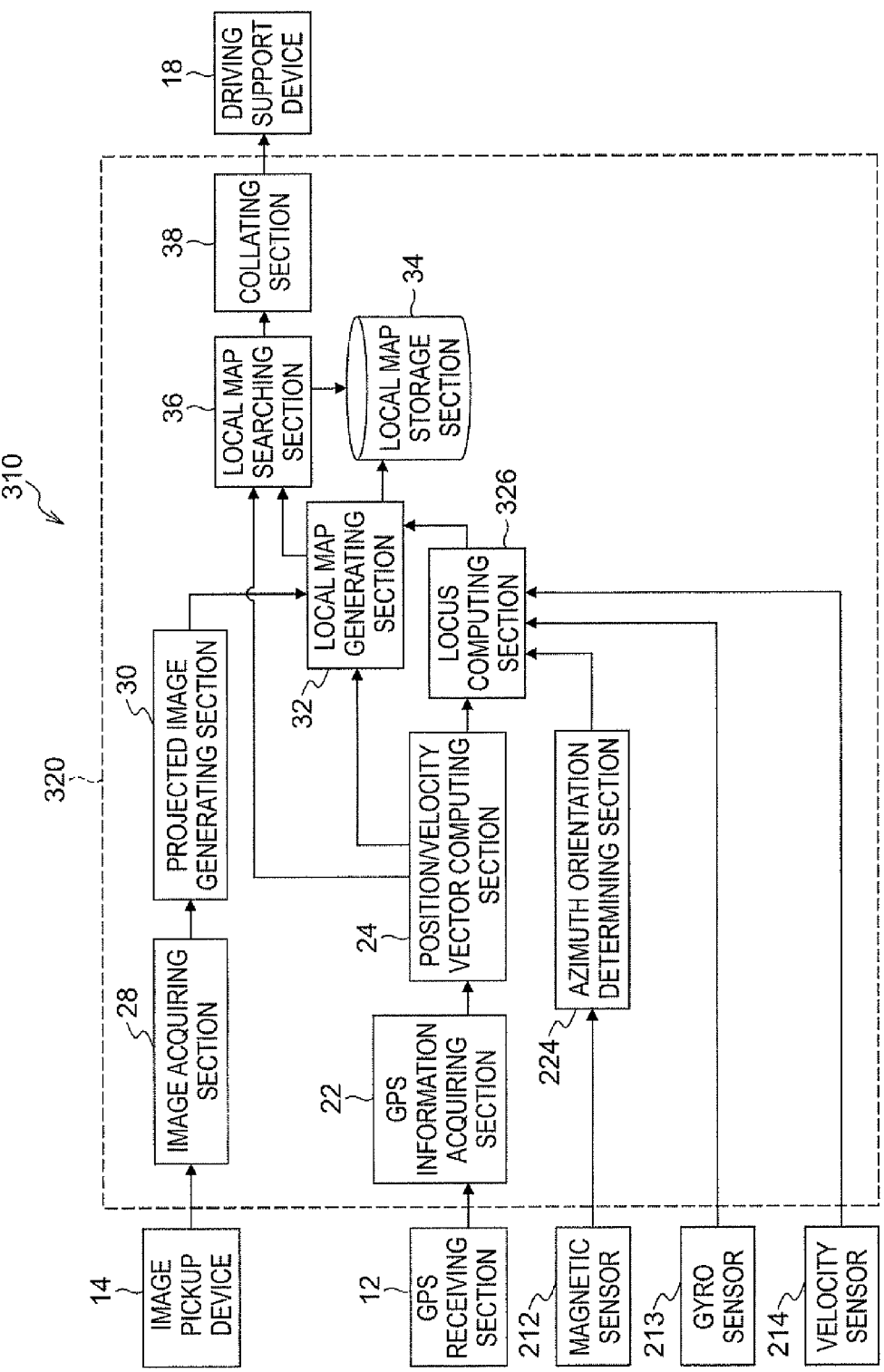
FIG. 14 is a block drawing showing a local map generating device relating to a third embodiment.

As shown in FIG. 14, a local map generating device 310 relating to the third embodiment has the GPS receiving section 12, the image pickup device 14, the magnetic sensor 212, the gyro sensor 213, the velocity sensor 214, and a computer 320 that generates a local map on the basis of the received signals from GPS satellites that are received by the GPS receiving section 12, and the respective detected values of the magnetic sensor 212, the gyro sensor 213 and the velocity sensor 214, and the forward images picked-up by the image pickup device 14.

The computer 320 has the GPS information acquiring section 22, the position/velocity vector computing section 24, the azimuth orientation determining section 224, a locus computing section 326 that computes the locus of ones own vehicle in a predetermined time on the basis of the determined azimuth angle, the detected value from the gyro sensor 213, the detected value from the velocity sensor 214, and the computed velocity vector, the image acquiring section 28, the projected image generating section 30, the local map generating section 32, and the local map storage section 34.

In a case in which the state of positioning of the GPS has not deteriorated, the locus computing section 326 integrates the velocity vector over a predetermined amount of time and computes the locus of the positions of ones own vehicle in that predetermined time, in the same way as in the above-described first embodiment. Further, in a case in which the state of positioning of the GPS has deteriorated, in the same way as in the above-described second embodiment, the locus computing section 326 integrates the yaw rate of a predetermined amount of time that was detected by the gyro sensor 213, and the velocity of a predetermined amount of time that was detected by the velocity sensor 214. On the basis of the results of integration and the azimuth angle of the traveling direction that was determined by the azimuth orientation determining section 224, the locus computing section 326 computes the locus of the positions of ones own vehicle in that predetermined time.

Note that, usually, the locus may be estimated by using the GPS receiving section 12, the magnetic sensor 212, the gyro sensor 213 and the velocity sensor 214, regardless of the state of the positioning in particular.

Note that the other structures and operations of the local map generating device relating to the third embodiment are similar to those of the first embodiment, and therefore, description thereof is omitted.

In this way, the local map generating device integrates the velocity vectors, that are computed on the basis of Doppler frequencies, and computes the locus of a moving body, and records, at respective regions on a local map, road surface projected images that are acquired for the respective points on the locus of ones own vehicle. Due thereto, the local map generating device can, by a simple structure, generate a local map that is highly accurate. Further, even in cases in which GPS information cannot be obtained, the local map generating device estimates the azimuth angle of ones own vehicle from the magnetic sensor, and integrates the yaw rate and the velocity detected by the gyro sensor and the velocity sensor, and computes the locus of ones own vehicle. The local map generating device records, at respective regions on the local map, the road surface projected images that are acquired for the respective points on the locus of ones own vehicle. Due thereto, the local map generating device can stably generate a local map.

A fourth embodiment is described next. The fourth embodiment describes, as an example, a case in which the present invention is applied to a global map generating device that generates a global map that is expressed by an absolute coordinate system. Note that portions that are structured similarly to the first embodiment are denoted by the same reference numerals, and description thereof is omitted.

Figure 15:
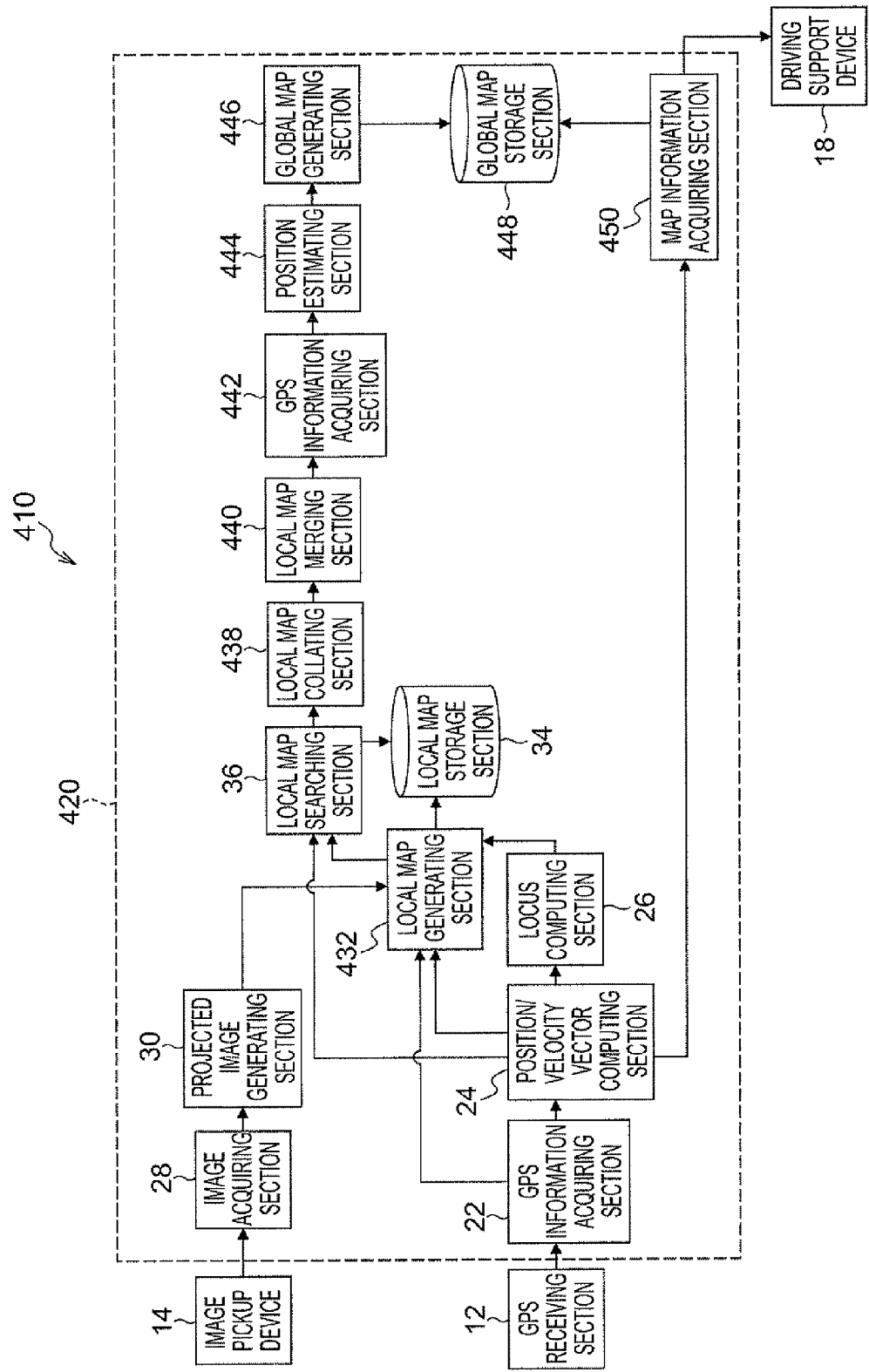
FIG. 15 is a block drawing showing a global map generating device relating to a fourth embodiment.

As shown in FIG. 15, a global map generating device 410 relating to the fourth embodiment has the GPS receiving portion 12, the image pickup device 14, and a computer 420 that, on the basis of received signals from GPS satellites that are received by the GPS receiving section 12 and the forward images picked-up by the image pickup device 14, generates a local map, and merges local maps and generates a global map, and outputs, to the driving support device 18, information of the periphery of ones own vehicle that is obtained from the global map.

The computer 420 is expressed by functional blocks in accordance with a global map generating processing routine and a driving support control processing routine that are described later. As shown in above-described FIG. 15, the computer 420 has the GPS information acquiring section 22, the position/velocity vector computing section 24, the locus computing section 26, the image acquiring section 28, the projected image generating section 30, a local map generating section 432 that generates a local map that records projected images along a computed locus of a predetermined time, and records, on the local map, GPS information that is obtained at the starting point of that locus (the origin of that local map), the local map storage section 34, the local map searching section 36, a local map collating section 438 that collates the generated local map and a retrieved local map and, on the basis of the results of collation, outputs the relative position of the two local maps, a local map merging section 440 that merges the generated local map and the retrieved local map in a collated state, a GPS information acquiring section 442 that acquires GPS information from each of the generated local map and retrieved local map, a position estimating section 444 that estimates an absolute position on the basis of the acquired GPS information of the two local maps and the relative position of the two local maps, a global map generating section 446 that, on the basis of the estimated absolute position, records the merged local map on a global map, and a global map storage section 448.

In the same way as in the above-described first embodiment, the local map generating section 432 generates a local map. Further, for the aforementioned starting point of the locus of ones own vehicle, the local map generating section 432 further records, in the local map, GPS information such as shown in FIG. 16 that is acquired by the GPS information acquiring section 22.

Note that the geographical point for which GPS information is recorded does not have to be the origin of the local map (the starting point of the locus), and may be recorded each time measurement is carried out or may be recorded at a uniform interval, or may be a specific place. The classification of the data and the frequency of holding the data do not matter provided that collation of plural local maps is possible and that an improvement in global accuracy is possible.

The local map collating section 438 carries out collation, that is based on the projected images that are recorded on the local maps, on the local map that is generated and the local map that is retrieved, and outputs, to the local map merging section 440, the relative position between the local maps that are based on the results of collation.

On the basis of the results of collation by the local map collating section 438, the local map merging section 440 merges the generated local map and the retrieved local map in a collated state.

The principles of the present embodiment are described next.

Figure 17:
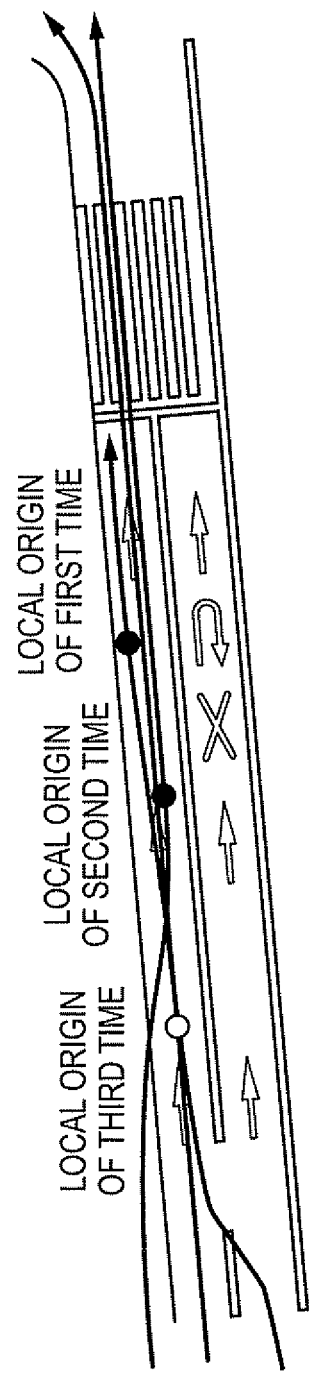
FIG. 17 is a drawing showing local maps that are generated by traveling plural times.
Figure 18:
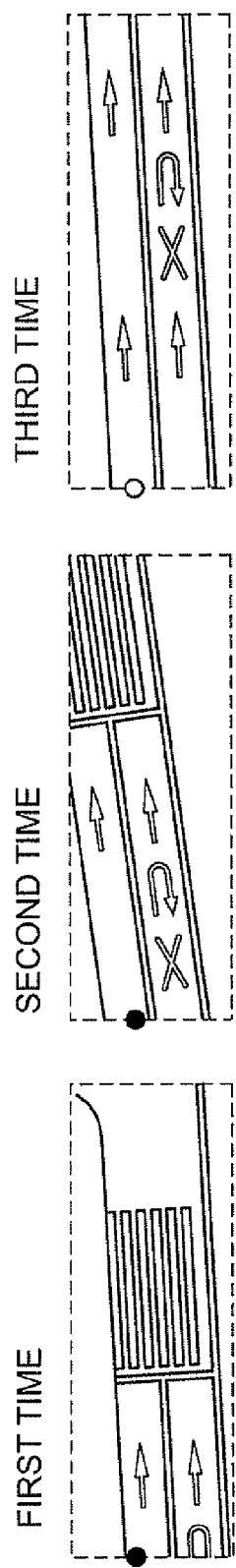
FIG. 18 is a drawing showing local maps that are generated by traveling plural times.
Figure 19:
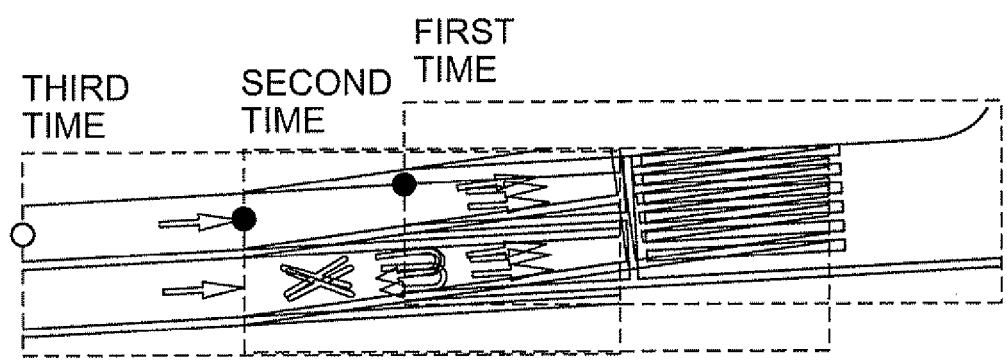
FIG. 19 is a drawing showing a state of collating local maps that are generated by traveling plural times.

In the highly accurate local map that is generated by the local map generating section 432, the relative positional relationships of the periphery are recorded with high accuracy within a given range. A plurality of these local maps, in which these highly accurate relative positional relationships are held, are readied due to traveling plural times as shown in FIG. 17 and FIG. 18. Even if there is offset of the starting points or ranges of the generated plural local maps, the relative positional relationships between the recorded information are correct. Therefore, as shown in FIG. 19, it is possible to accurately acquire the relative positional relationships between local maps due to the association between the information.

On the other hand, the results of positioning using general GPS have an error of from several m to, in cities, several tens of m. However, achieving high accuracy is possible by utilizing the relative positional relationships of plural local maps and the GPS information of those times, and determining the optimal value of the results of positioning.

In positioning using usual GPS, positioning is not possible unless four or more visible satellites exist. Further, in cases in which reflected waves become the main waves, the effects thereof are great, and there is the possibility that the positioning error will become large. However, by using the relative positional relationships and by utilizing GPS information that is obtained at other geographical points at other times of traveling, the number of satellites can be increased virtually. Further, because satellites of other time instants can be used, the bias toward the arrangement of the satellites disappears, and there is the possibility that accuracy will improve. Further, because the number of satellites increases, it is easy to eliminate a satellite having a large error, and an improvement in accuracy can be realized.

Thus, in the present embodiment, GPS information, that is recorded for the origin, is acquired by the GPS information acquiring section 442 for each of the local map that is generated and the local map that is retrieved.

Further, on the basis of the acquired GPS information of the two local maps and the relative position of the two local maps, the position estimating section 444 estimates the absolute position of the origin of the local map that is generated at the present point in time.

Here, the principles of estimating the absolute position by using GPS information obtained at two geographical points and the relative position of the two geographical points are described.

First, in position estimation in accordance with the accumulation of GPS data at a same geographical point (Xv, Yv, Zv), following formula (11) is established.

[Mathematical Expression 10]

$$\begin{cases} \rho_{j0}(t_0) = \sqrt{(Xs_{j0}(t_0) - Xv)^2 + (Ys_{j0}(t_0) - Yv)^2 + (Zs_{j0}(t_0) - Zv)^2} + Cb_0 \\ \vdots \\ \rho_{k0}(t_0) = \sqrt{(Xs_{k0}(t_0) - Xv)^2 + (Ys_{k0}(t_0) - Yv)^2 + (Zs_{k0}(t_0) - Zv)^2} + Cb_0 \\ \vdots \\ \rho_{ji}(t_i) = \sqrt{(Xs_{ji}(t_i) - Xv)^2 + (Ys_{ji}(t_i) - Yv)^2 + (Zs_{ji}(t_i) - Zv)^2} + Cb_i \\ \vdots \\ \rho_{jn}(t_n) = \sqrt{(Xs_{jn}(t_n) - Xv)^2 + (Ys_{jn}(t_n) - Yv)^2 + (Zs_{jn}(t_n) - Zv)^2} + Cb_n \end{cases} \quad (11)$$

A formula is established for each acquired pseudo distance of each GPS satellite, and a number of formulas is established which number is equal to the number of data that have been accumulated. Because the clock bias, that is the timepiece error of the receiver, differs at each receiving time, there is the need to estimate a number of clock biases which number is equal to the number of data that have been accumulated. Because (Xv, Yv, Zv) and n Cb's are unknown, the equations can be solved if a number of satellites that is 3+n can be ensured by accumulation. However, usually, at a moving body, always carrying out measurement at a same geographical point is impractical.

Above formula (11) is established as well for each geographical point (Xv(t0), 'Yv(t0), Zv(t0)), (Xv(ti), Yv(ti), Zv(ti)) at which the positioning geographical points are different. Therefore, the equations shown by following formula (12) are obtained.

[Mathematical Expression 11]

$$\begin{cases} \rho_{j0}(t_0) = \sqrt{(Xs_{j0}(t_0) - Xv(t_0))^2 + (Ys_{j0}(t_0) - Yv(t_0))^2 + (Zs_{j0}(t_0) - Zv(t_0))^2} + Cb_0 \\ \vdots \\ \rho_{k0}(t_0) = \sqrt{(Xs_{k0}(t_0) - Xv(t_0))^2 + (Ys_{k0}(t_0) - Yv(t_0))^2 + (Zs_{k0}(t_0) - Zv(t_0))^2} + Cb_0 \\ \vdots \\ \rho_{ji}(t_i) = \sqrt{(Xs_{ji}(t_i) - Xv(t_i))^2 + (Ys_{ji}(t_i) - Yv(t_i))^2 + (Zs_{ji}(t_i) - Zv(t_i))^2} + Cb_i \\ \vdots \\ \rho_{jn}(t_n) = \sqrt{(Xs_{jn}(t_n) - Xv(t_n))^2 + (Ys_{jn}(t_n) - Yv(t_n))^2 + (Zs_{jn}(t_i) - Zv(t_n))^2} + Cb_n \end{cases} \quad (12)$$

The case of a moving vehicle corresponds to the equations of above formula (12) because acquisition at the same geographical point is difficult. Above formula (12) is established for each position (Xv(ti), Yv(ti), Zv(ti)) corresponding to a time instant at which data is acquired, and therefore, there are 4×n unknowns, and there is no meaning to accumulation. However, in the present embodiment, the relative position between the respective positions is acquired from the results of collating local maps, and relative position (ΔXi0(t0), ΔYi0 (t0), ΔZi0(t0)) is determined, and, by using the relative position, (Xv(ti), Yv(ti), Zv(ti)) can be expressed as (Xv(ti), Yv(ti), Zv(ti))=(Xv(t0)−Δxi0(t0), Yv(t0)−Δyi0(t0), Zv(t0)−Δzi0(t0)). Therefore, above formula (12) is rewritten into the form of following formula (13).

[Mathematical Expression 12]

$$\begin{cases} \rho_{j0}(t_0) = \sqrt{(Xs_{j0}(t_0) - Xv(t_0))^2 + (Ys_{j0}(t_0) - Yv(t_0))^2 + (Zs_{j0}(t_0) - Zv(t_0))^2} + Cb_0 \\ \vdots \\ \rho_{k0}(t_0) = \sqrt{(Xs_{k0}(t_0) - Xv(t_0))^2 + (Ys_{k0}(t_0) - Yv(t_0))^2 + (Zs_{k0}(t_0) - Zv(t_0))^2} + Cb_0 \\ \vdots \\ \rho_{ji}(t_i) = \sqrt{(Xs_{ji}(t_i) - (Xv(t_0) - \Delta x_{i0}(t_0)))^2 + (Ys_{ji}(t_i) - (Yv(t_0) - \Delta y_{i0}(t_0)))^2 + (Zs_{ji}(t_i) - (Zv(t_0) - \Delta z_{n0}(t_0)))^2} + Cb_i \\ \vdots \\ \rho_{jn}(t_n) = \sqrt{(Xs_{jn}(t_n) - (Xv(t_0) - \Delta x_{n0}(t_0)))^2 + (Ys_{jn}(t_n) - (Yv(t_0) - \Delta y_{n0}(t_0)))^2 + (Zs_{jn}(t_n) - (Zv(t_0) - \Delta z_{n0}(t_0)))^2} + Cb_n \end{cases} \quad (13)$$

Above formula (13) is the same as above formula (11) because there are 3+n unknowns because the relative position between the positions at each time instant is obtained. Accordingly, a situation that is the same as if measurement was carried out repeatedly at the same geographical point can be realized.

Figure 20:
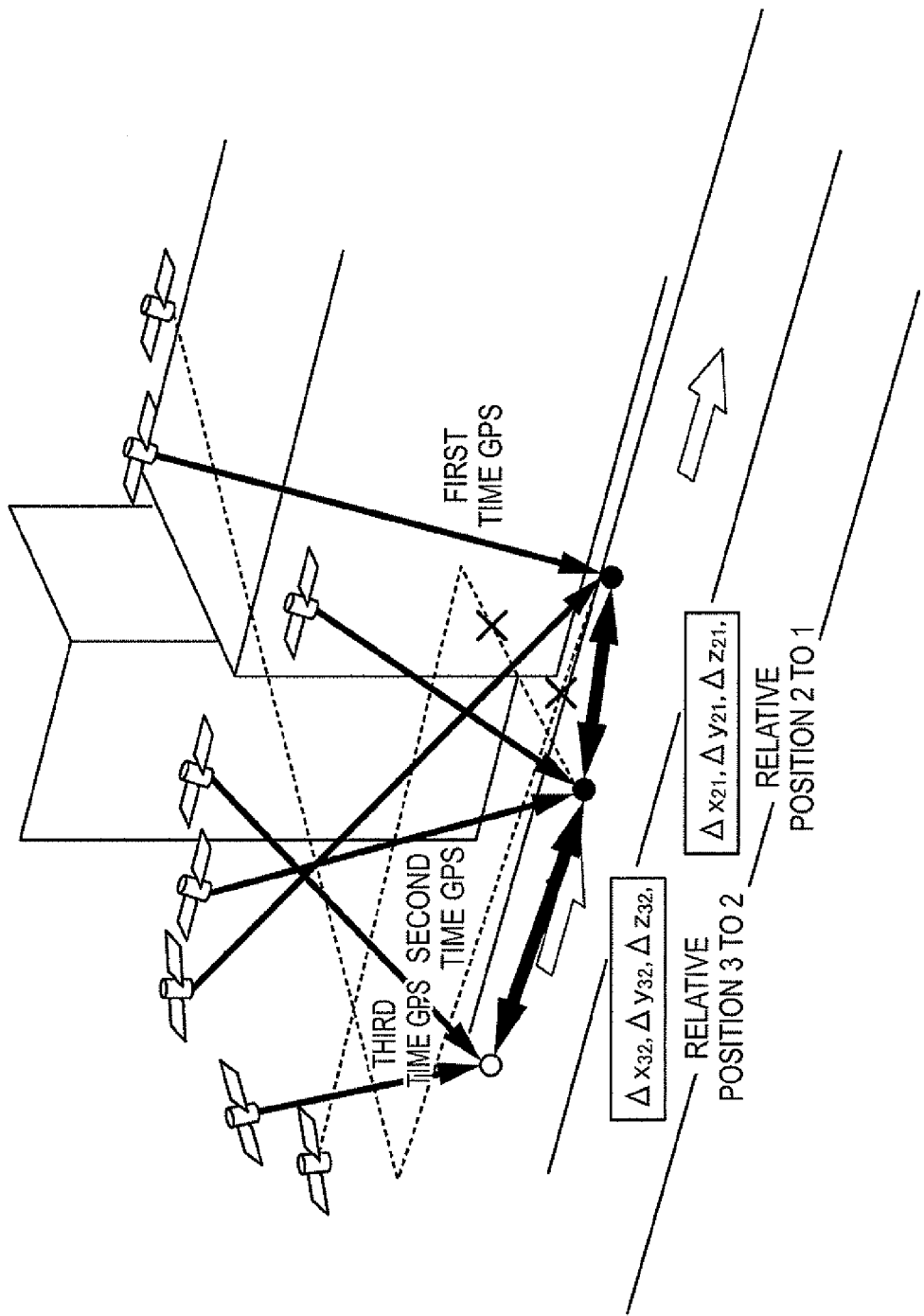
FIG. 20 is a drawing for explaining a method for estimating an absolute position by using GPS information acquired at respective origins of local maps that are generated by traveling plural times.

Further, optimal position estimation, that uses the relative positional relationship between the origins of the collated local maps and the GPS information of that time, is shown in FIG. 20. In this optimal position estimation, information that is needed for above formula (13) is acquired from the previous stage, and optimal estimation is carried out. In above formula (13), the number of estimation parameters is 3+n which is the three-dimensional position and the clock bias of the receiver at each time, but it is also possible to reduce the parameters depending on height limitations and the performance of the receiver and the like. Provided that the position estimation is carried out by using GPS information of respective geographical points by using relative positional relationships, the number of parameters in the optimal position estimation and the method of determining the optimal solution thereof are not particularly limited.

In the above-described optimal position estimation, it is possible to virtually increase the number of satellites, and therefore, an improvement in the positioning accuracy due to the effects of averaging is expected. Not only due to the effects of averaging, but also because the number of satellites is increased, the combination of satellites that are needed for positioning can be changed in various ways. When using specific satellites in positioning, if the results of positioning differ from other combinations, there is a high possibility that the signals from the satellites are multipass. Because judgment regarding multipass by accumulation is easy, multipass judgment is carried out actively, and by making it such that information of satellites that are thought to be multipass is not utilized, an improvement in accuracy can be anticipated. Further, at the time of determining the positioning solution, correction data and data of a base station may be used.

As described above, the position estimating section 444 estimates the absolute position for the origin of the local map that is generated at the present point in time, in accordance with above formula (13) and on the basis of the GPS information of two or more merged local maps and the relative position of two local maps. Further, when there are 4 unknown numbers, in a case in which the number of satellites is 5 or more, the position estimating section 444 estimates the absolute position for each combination of satellites, and, on the basis of the estimated absolute positions, caries out multipass judgment, and removes information of satellites judged to be multipass, and again carries out estimation of the absolute position of the origin of the local map that is generated at the current point in time. In a case in which there are 3+n unknown numbers, when the number of satellites is 4+n, multipass judgment can be carried out. Note that the estimation of the absolute position may be carried out with respect to the origin of the local map that has been retrieved, or may be carried out with respect to each of the origins of two or more local maps.

The global map generating section 446 records the merged local map at a region, that is determined in accordance with the absolute position estimated by the position estimating section 444, on a global map that is expressed by an absolute coordinate system.

The global map generated by the global map generating section 446 is stored in global map storage section 448.

The computer 420 further has a map information acquiring section 450 that, on the basis of the position of ones own vehicle that was computed by the position computing section 51, acquires map information of the periphery of ones own vehicle from the global map storage section 448, and outputs the map information to the driving support device 18.

By using, as a key, the position of ones own vehicle that was computed by the position computing section 51, the map information acquiring section 450 searches for the map information that was recorded for the periphery of the position of ones own vehicle (information recorded in the local map) from the global map storage section 448, and outputs the retrieved map information to the driving support device 18.

Operation of the global map generating device 410 relating to the fourth embodiment is described next. Note that processings that are similar to those of the first embodiment are denoted by the same reference numerals, and description thereof is omitted.

Figure 21:
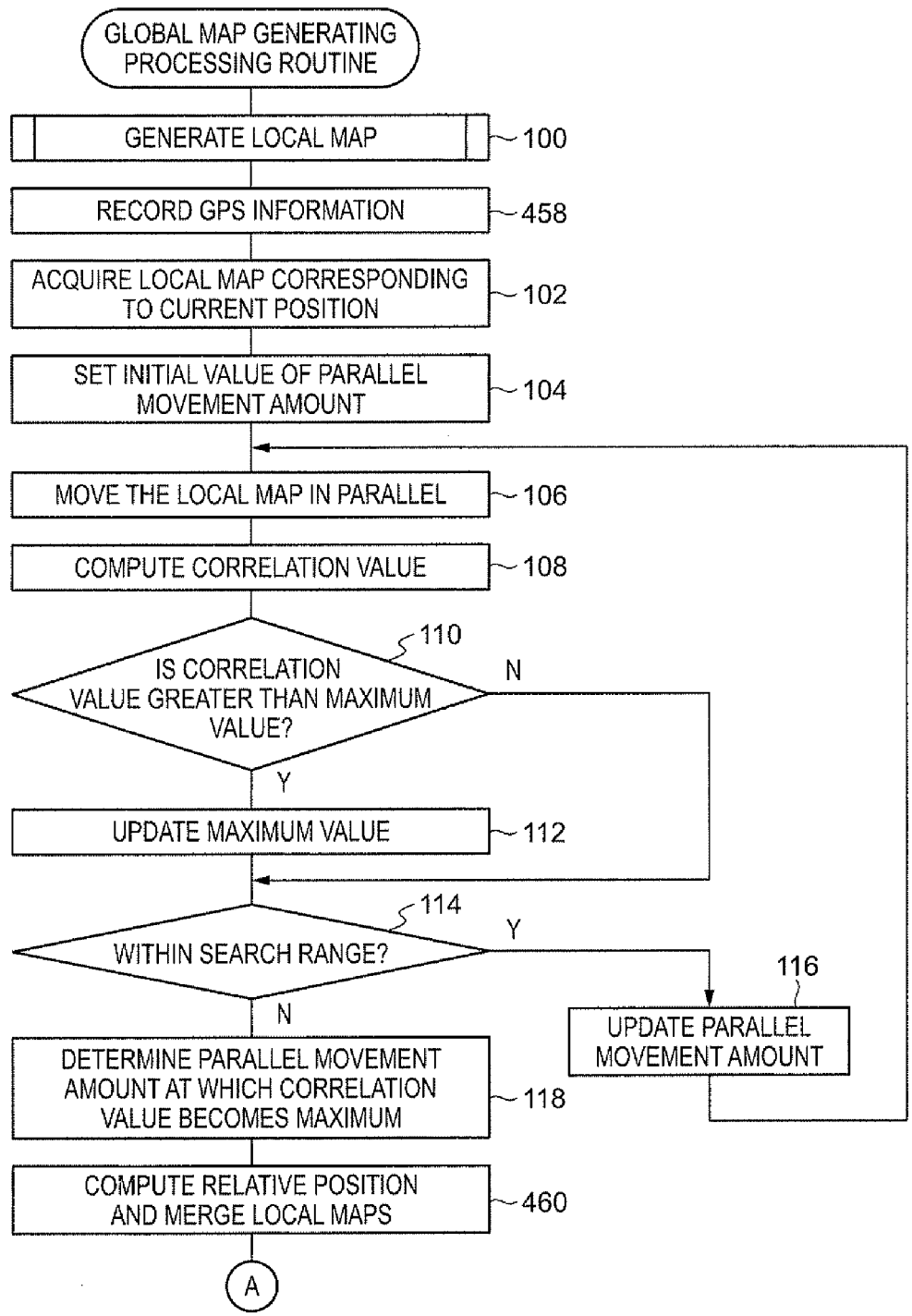
FIG. 21 is a flowchart showing the contents of a global map generating processing routine at a computer of the global map generating device relating to the fourth embodiment.
Figure 22:
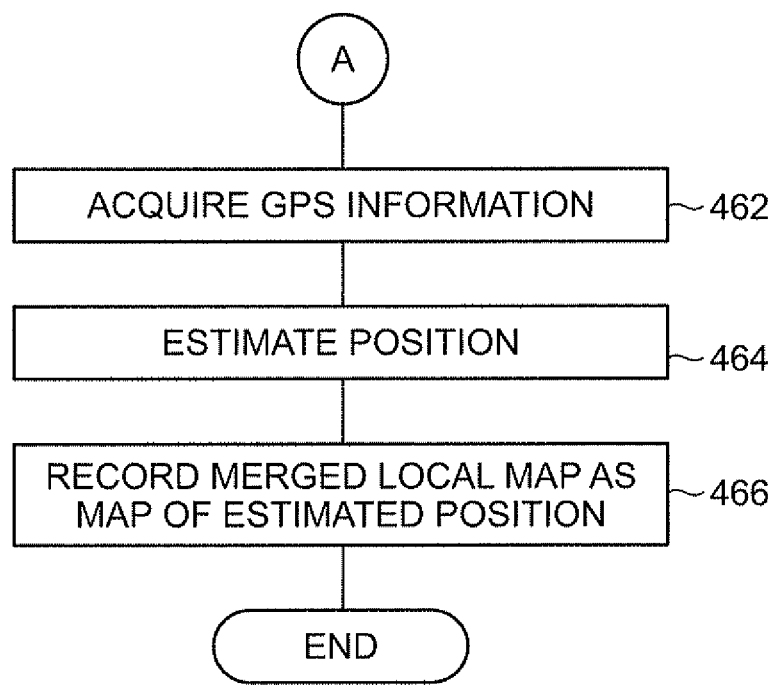
FIG. 22 is a flowchart showing the contents of the global map generating processing routine at the computer of the global map generating device relating to the fourth embodiment.

First, when radio waves are being repeatedly received from plural GPS satellites by the GPS receiving section 12, the global map generating processing routine shown in FIGS. 21 and 22 is repeatedly executed at the computer 420.

First, in step 100, the computer 420 executes the local map generating processing shown in above-described FIG. 10, and generates a local map relating to the periphery of the locus on which ones own vehicle is traveling. In next step 458, the computer 420 records GPS information, that was acquired for the starting point of the locus in above step 130, in the generated local map.

Then, in step 102, by using, as a key, the position of the origin of the local map generated in above step 100, the computer 420 searches for the local map, that was generated for the periphery of that position, from the local map storage section 34, and acquires the local map.

In next step 104, the computer 420 sets the initial value of the parallel movement amount $\Delta d$ ($=(\Delta ei, \Delta ni, \Delta ui)$) of the local map generated in above step 100, and sets the maximum value of the correlation value to 0. In step 106, the computer 420 moves the local map, that was generated in above step 100, in parallel by the set parallel movement amount $\Delta d$. In step 108, the computer 420 computes the correlation value with the local map that was acquired in above step 102.

Then, in step 110, the computer 420 judges whether or not the correlation value computed in above step 108 is greater than the maximum value of the correlation value. If the computed correlation value is less than or equal to the maximum value, the computer 420 moves on to step 114. On the other hand, if the computed correlation value is greater than the maximum value of the correlation value, in step 112, the computer 420 updates the maximum value of the correlation value, and proceeds to step 114.

In step 114, the computer 420 judges whether or not the parallel movement amount $\Delta d$ is within a predetermined search range. If the parallel movement amount $\Delta d$ is within the search range, in step 116, the computer 420 updates the parallel movement amount $\Delta d$ to $\Delta d + \delta d$, and returns to above step 106. On the other hand, if the parallel movement amount $\Delta d$ exceeds the predetermined search range, the computer 420 proceeds to step 118 and determines the parallel movement amount at which the correlation value becomes the maximum value.

Then, in step 460, on the basis of the parallel movement amount determined in above step 118, the computer 420 determines the relative position of the origin of the local map acquired in above step 102, with respect to the origin of the current local map. The computer 420 merges the local map generated in above step 100, in a state of being moved in parallel by the set parallel movement amount $\Delta d$, with the local map acquired in above step 102.

In next step 462, the computer 420 acquires the GPS information that was recorded in above step 458, and acquires the GPS information of the origin recorded in the local map that was acquired in above step 102. Then, in step 464, on the basis of the relative position computed in above step 460 and the GPS information acquired in above step 462, the computer 420 estimates the absolute position of the origin of the local map generated in above step 100.

Then, in step 466, on the basis of the absolute position estimated in above step 464, the computer 420 records, on the global map, the local map that was merged in above step 460, and ends the global map generating processing routine.

Due to the above-described global map generating processing routine being executed repeatedly, a global map, in which merged local maps are recorded at plural geographical points, is generated.

Figure 23:
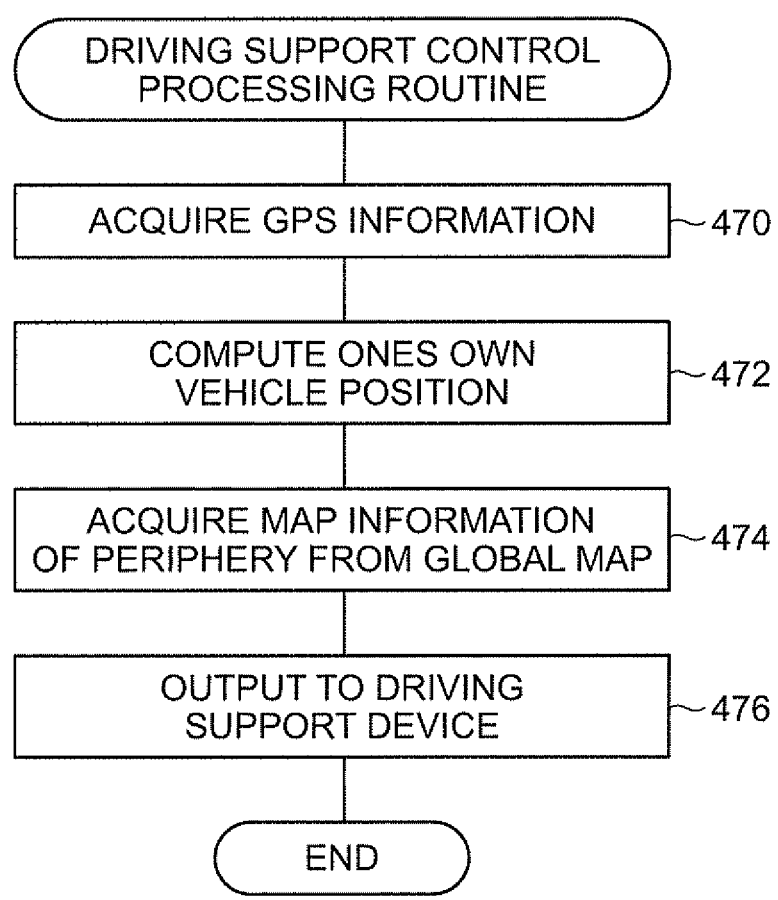
FIG. 23 is a flowchart showing the contents of a driving support control processing routine at the computer of the global map generating device relating to the fourth embodiment.

Further, the driving support control processing routine shown in FIG. 23 is repeatedly executed by the computer 420.

First, in step 470, the computer 420 acquires information of plural GPS satellites from the GPS receiving section 12, and computes and acquires GPS pseudo distance data of the plural GPS satellites, Doppler frequencies, and the positional coordinates of the GPS satellites.

Then, in step 472, the computer 420 computes the position of ones own vehicle in accordance with above formulas (1) through (3) by using the GPS pseudo distance data of the respective GPS satellites. In next step 474, the computer 420 acquires map information of the periphery from the global map storage section 448 by using, as a key, the position of ones own vehicle that was computed in above step 472. In step 476, the computer 420 outputs the map information acquired in above step 474 to the driving support device 18, and ends the driving support control processing routine.

As described above, the global map generating device relating to the fourth embodiment generates a highly accurate local map, and collates road surface projected images that are recorded in local maps, and merges plural local maps. In accordance with the estimated absolute position, the global map generating device records the merged plural local maps on the global map that is expressed by an absolute coordinate system. Due thereto, the global map generating device can, by a simple structure, generate a highly accurate global map.

Because the locus accuracy is high, the relative accurate within a given range is high, but errors accumulate when the range becomes broad. Therefore, some type of constraint is needed, and, in the present embodiment, there is constraining by the absolute position that is a common coordinate system.

Because the accuracy of a usual GPS for navigation is several meters at best, the absolute accuracy in the traveling of one time is low. On the other hand, the relative accuracy of local maps that are generated by repeated traveling is high, and therefore, the relative positional relationship between plural local maps can be acquired highly accurately. If the relative position between local maps can be acquired, the accuracy improves by making the relative positional relationship be a constraint and optimizing the absolute position. In the case of a GPS for navigation, for example, GPS information at the time of generating each local map is collected, and positioning can be carried out by data of plural times. By doing so, the number of satellites increases, and further, it becomes easy to exclude satellites having large errors, and increasing of the accuracy of the absolute position can be anticipated. In this way, the global map generating device can, from repeated effects, generate a global map at an accuracy higher than the accuracy of positioning of a GPS.

Further, usually, travelling takes place in a special-purpose measurement vehicle, and the needed information is extracted manually. However, in the present embodiment, the global map generating device can generate a map at an accuracy that is equivalent to that of a highly accurate measurement vehicle, by sensors that are installed in a typical vehicle. Therefore, the cost of generating maps can be reduced.

Further, the global map generating device uses data that can be acquired by a typical vehicle, and measurement of data at all times is possible. Therefore, updating of a highly accurate map is easy, and the maintenance cost of the map can be reduced.

Further, the global map generating device utilizes a highly accurate locus, and generates local maps whose relative accuracies are ensured, and acquires, with high accuracy, the relative position between local maps by aligning the plural local maps that are obtained by repeated traveling. The global map generating device can ensure the absolute accuracy by using this relative positional relationship as a constraint.

Due to the global map generating device estimating the relative position between local maps and utilizing the relative position as an intermediary, GPS information at different geographical points that are obtained while traveling can be integrated together. Therefore, the global map generating device does not need to acquire GPS information at a same geographical point.

Further, even in a case in which the number of satellites is insufficient in the one-time acquisition of GPS information, due to the global map generating device using GPS information of plural times, the number of satellites can be increased simulatively, and therefore, positioning becomes possible and the positioning rate improves.

A global map generating device relating to a fifth embodiment is described next. Note that portions that are structured similarly to the first embodiment and the fourth embodiment are denoted by the same reference numerals, and description thereof is omitted.

The fifth embodiment differs from the fourth embodiment with regard to the point that the global map generating device estimates the absolute position by carrying out optimal estimation on the basis of results of positioning that are recorded in each of the local maps that are merged.

Figure 24:
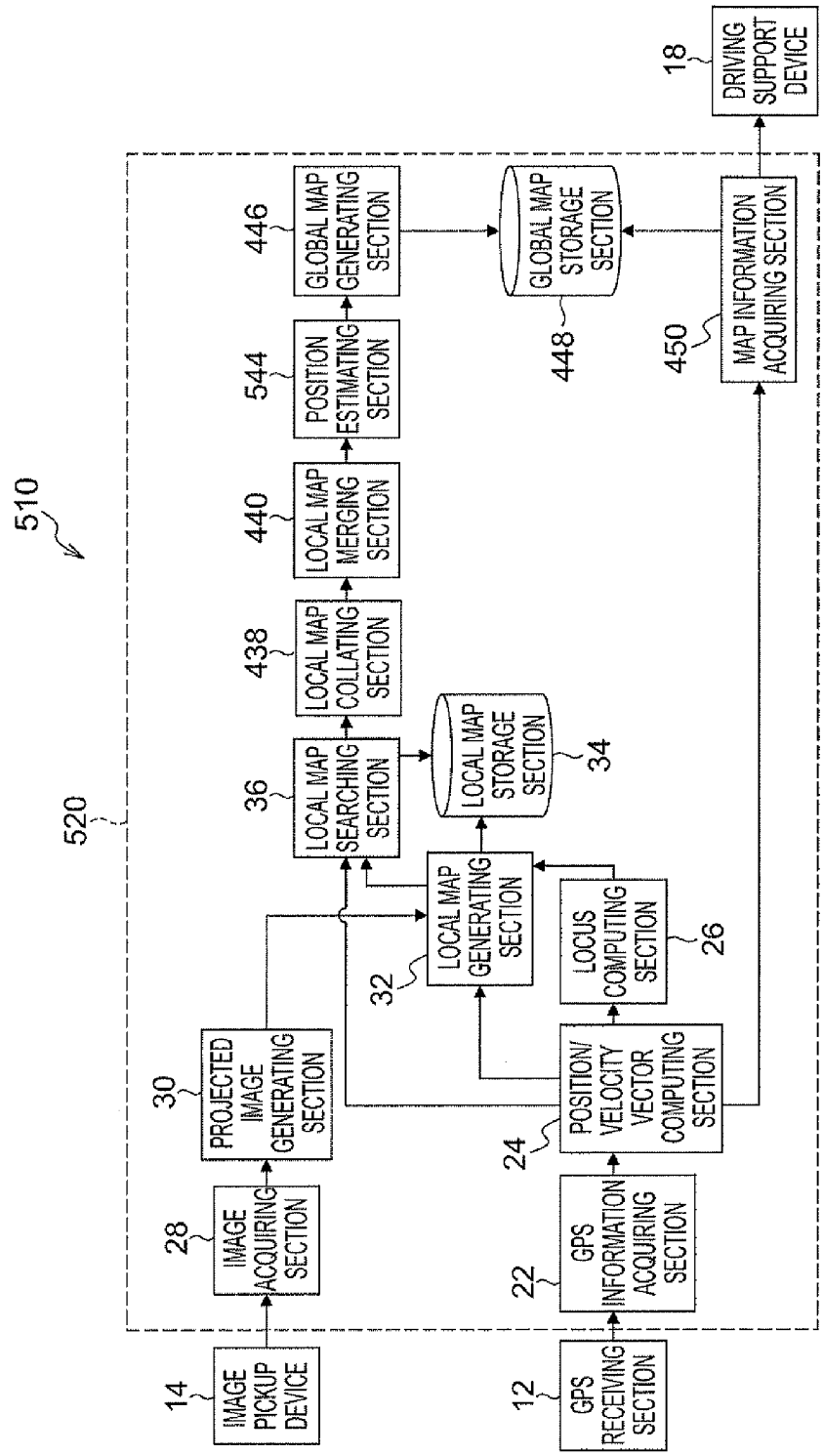
FIG. 24 is a block drawing showing a global map generating device relating to a fifth embodiment.

As shown in FIG. 24, a computer 520 of a global map generating device 510 relating to the fifth embodiment has the GPS information acquiring section 22, the position/velocity vector computing section 24, the locus computing section 26, the image acquiring section 28, the projected image generating section 30, the local map generating section 32, the local map storage section 34, the local map searching section 36, a local map collating section 438, a local map merging section 440, a position estimating section 544 that estimates absolute positions on the basis of the results of positioning that are recorded for each of the generated local map and the retrieved local map, the global map generating section 446, the global map storage section 448, and the map information acquiring section 450.

The local map generating section 32 generates local maps that record projected images, along the computed locus of a predetermined time, and, for each geographical point of that locus, records the position computed by the position computing section 51 (the results of positioning) in the local map.

The position estimating section 544 carries out optimal estimation using, for example, the method of least squares or the like, on the basis of the results of positioning of each point that are recorded for each of the generated local map and the retrieved local map, and estimates the absolute position of each geographical point on the locus of the generated local map.

Note that, because the structure and operation of the global map generating device 510 relating to the fifth embodiment are similar to those of the fourth embodiment, description thereof is omitted.

In this way, the global map generating device carries out optimal estimation on the basis of the relative position between the local maps and the results of positioning that are recorded on the local maps. Due thereto, the global map generating device can accurately estimate absolute positions, and can generate a global map that is highly accurate.

Note that the above embodiment describes, as an example, a case in which the global map generating device records the results of positioning for each point of the locus on the local map, but is not limited to this. The global map generating device may record the results of positioning for the origin or a specific point of the locus on the local map, and may optimally estimate the absolute position on the basis of these results of positioning.

Further, the above first embodiment through fourth embodiment describe, as examples, cases in which the local map generating device or the global map generating device records the results of positioning for the origin of the locus on the local map, but are not limited to this. The local map generating device or the global map generating device may record the results of positioning for another specific point of the locus on the local map.

Further, the local map generating device or the global map generating device may record the results of positioning for each point of the locus on the local map. In this case, the local map generating device or the global map generating device may record only results that can be measured with high accuracy by interference positioning such as RTK-GPS or the like. Further, the local map generating device or the global map generating device may record the position of ones own vehicle that is determined by integrating a GPS and various types of sensors.

Further, the local map generating device or the global map generating device may carry out positioning by utilizing a fixed point that can always be measured, by a beacon or the like. Further, the local map generating device or the global map generating device may carry out positioning by utilizing a specific geographical point that is obtained from an image. In this case, it suffices for the local map generating device or the global map generating device to be provided with an image collation database that stores images in correspondence with the correct positional information, and to carry out positioning by collating a picked-up image and images of the image collation database.

Further, although a case that uses the image pickup device as the means for acquiring environment information of the periphery is described as an example, the present invention is not limited to this. The local map generating device or the global map generating device may estimate the distance to an object by stereo by using plural image pickup devices, and may use the value thereof as environment information. Further, the local map generating device or the global map generating device may directly measure the distance to an object that exists at the periphery by using laser radar. Further, the local map generating device or the global map generating device may combine an image pickup device and a laser and acquire environment information of the periphery.

Further, the local map storage section or the global map storage section may be provided on a server that can communicate with vehicles. Due thereto, even if ones own vehicle is on a road that it is traveling on for the first time, if the road is a road that other vehicles have traveled upon, the local map generating device or the global map generating device can utilize the information of the maps.

Further, a case in which the global map generating device estimates absolute positions at the time of generating a global map has been described as an example, but the present invention is not limited to this. The technique of estimating the absolute position, that was described in the above fourth embodiment or fifth embodiment, may be applied to the local map generating devices of the above first embodiment through third embodiment. Due thereto, the absolute position accuracy of a specific point on the local map can be improved, and therefore, the accuracy of the above-described local map also improves at the relative positions, and not only the relative position accuracy, but also the absolute position accuracy can be improved.

Further, the above embodiments describe, as examples, cases in which the local map generating device or the global map generating device computes the velocity vector, but the present invention is not limited to this. The local map generating device or the global map generating device may compute the azimuth angle of ones own vehicle, and detect the velocity of ones own vehicle, and utilize velocity information that is formed from the azimuth angle of ones own vehicle and the velocity. In this case, it suffices for the local map generating device or the global map generating device to compute the locus from the azimuth angle and the velocity of ones own vehicle of a predetermined time period.

Further, the techniques that were described in the above second embodiment or third embodiment may be applied to the above fourth embodiment and fifth embodiment. For example, the global map generating device may compute the locus of ones own vehicle without using GPS information, or may compute the locus of ones own vehicle by using GPS information and various types of sensor outputs.

Further, the local map generating device or the global map generating device may compute the position of ones own vehicle by using results of composite navigation in accordance with a combination of measured values of a GPS and a gyro and velocity sensors.

Further, the above embodiments describe the local map generating device and the global map generating device that are installed in a vehicle, but the moving body in which the local map generating device or the global map generating device of the present invention is installed is not limited to a vehicle. For example, the local map generating device or the global map generating device may be installed in a robot, or the local map generating device or the global map generating device may be structured as a portable terminal such that a pedestrian can carry the device.

Further, the local map generating device or the global map generating device may be realized by a server and not a moving body, or may be installed in a device on a road or in a moving body that is in another periphery. In this case, it suffices to structure a local map generating system that includes information acquiring devices, that acquire various types of information from an image pickup device or a GPS receiving section, a magnetic sensor, a gyro sensor, a velocity sensor that are installed in a moving body, and a local map generating device that generates a local map on the basis of the various types of information acquired by the information acquiring devices that are installed in the moving body. Or, it suffices to structure a global map generating system that is formed from information acquiring devices that are installed in a moving body, and a global map generating device that generates a global map on the basis of various types of information acquired by the information acquiring devices.

A computer-readable medium of an aspect of the present invention is a computer-readable medium that stores a program for causing a computer to function as respective sections of a local map generating device that includes an environment information acquiring section that is installed in a moving body and that acquires environment information of a periphery of the moving body as seen from a set position, the program causing the computer to function as: a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; a computing section that, on the basis of the satellite information acquired by the satellite information acquiring section, computes a velocity vector that includes a traveling direction of the moving body, or velocity information that expresses a velocity of the moving body and the traveling direction of the moving body; a locus computing section that integrates the velocity information of the moving body that was computed by the computing section, and computes a locus of positions of the moving body; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

A computer-readable medium of an aspect of the present invention is a computer-readable medium that stores a program for causing a computer to function as respective sections of a local map generating device that includes an environment information acquiring section that is installed in a moving body and that acquires environment information of a periphery of the moving body as seen from a set position, the program causing the computer to function as: an azimuth angle estimating section that estimates an azimuth angle of a reference direction of the moving body, on the basis of a motion state of the moving body that is detected by a motion state detecting section that detects a motion state of the moving body; a locus computing section that integrates the motion state of the moving body detected by the motion state detecting section, and computes a locus of positions of the moving body on the basis of the integrated motion state of the moving body and the azimuth angle estimated by the azimuth angle estimating section; and a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section.

The disclosure of Japanese Patent Application No. 2011-46349 is, in its entirety, incorporated by reference into the present Description.

All documents, patent applications, and technical standards mentioned in the present Description are incorporated by reference into the present Description to the same extent as if such individual document, patent application, or technical standard was specifically and individually indicated to be incorporated by reference.

The invention claimed is:

1. A local map generating device comprising:
    an environment information acquiring section that is installed in a moving body, and that acquires environment information of a periphery of the moving body as seen from a set position;
    a projected information generating section that generates projected information by projecting a position on the environment information acquired by the environment information acquiring section on a road surface based on a set position and a posture of the environment information acquiring section;
    a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites;
    a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body;
    a locus computing section that integrates the velocity vector or the velocity information of the moving body that was computed by the computing section, and computes a locus of positions of the moving body; and
    a local map generating section that records the projected information in respective regions on a local map that includes the locus of positions of the moving body and that is determined on the basis of the traveling direction of the moving body at each point on the locus,
    wherein the local map generating section (i) records a starting point of the locus as the origin of the local map, (ii) computes a position on the local map corresponding to the position of the projected information based on the position of the moving body that was computed by the computing section and a traveling direction of the moving body on the locus, and (iii) records the projected information on the local map based on the computed position on the local map.

2. The local map generating device of claim 1, wherein the computing section computes directions of the respective GPS satellites as seen from the moving body on the basis of the information relating to the positions of the respective GPS satellites and the position of the moving body that is obtained from the information relating to the distances between the respective GPS satellites and the moving body, and computes velocities of the respective GPS satellites on the basis of information relating to the positions of the respective GPS satellites in time sequence, and computes velocities of the moving body in directions of the respective GPS satellites on the basis of the directions of the respective GPS satellites as seen from the moving body, the velocities of the respective GPS satellites, and the information relating to relative velocities of the moving body with respect to the respective GPS satellites, and computes the velocity vector of the moving body on the basis of the plurality of velocities of the moving body in the directions of the respective GPS satellites.

3. The local map generating device of claim 1, wherein the information relating to the positions of the respective GPS satellites is satellite orbit information, the information relating to the distances between the respective GPS satellites and the moving body is pseudo distance information, and the information relating to the relative velocities of the moving body with respect to the respective GPS satellites is Doppler frequency information.

4. The local map generating device of claim 1, wherein the environment information acquiring section is an image pickup section that picks-up images of the periphery of the moving body, or is a laser radar that measures distance information to objects existing at the periphery of the moving body.

5. A global map generating device comprising:
    the local map generating device of claim 1;
    a local map storage section that stores a plurality of the generated local maps;
    a merging section that, between a plurality of local maps, collates the environment information that is recorded in the local maps, and merges the plurality of local maps in a state in which the environment information has been collated;
    a position estimating section that estimates an absolute position of at least one point on the locus of the plurality of local maps that were merged by the merging section; and
    a global map generating section that, on the basis of the absolute position estimated by the position estimating section, records the plurality of local maps, that were merged by the merging section, on a global map that is expressed by an absolute coordinate system.

6. A global map generating device comprising:
    the local map generating device of claim 1;
    a local map storage section that stores a plurality of the generated local map;
    a merging section that, between a plurality of local maps, collates the environment information that is recorded in the local maps, and merges the plurality of local maps in a state in which the environment information has been collated;
    a position estimating section that estimates an absolute position of at least one point on the locus of the plurality of local maps that were merged by the merging section; and
    a global map generating section that, on the basis of the absolute position estimated by the position estimating section, records the plurality of local maps, that were merged by the merging section, on a global map that is expressed by an absolute coordinate system,
    wherein the local map generating section records, in the local map, the satellite information that was acquired by the satellite information acquiring section, for the at least one point on the locus of positions of the moving body computed by the locus computing section, and the position estimating section estimates the absolute position of the at least one point on the locus of the plurality of merged local maps, on the basis of a relative position between the at least one point of each of the plurality of local maps, which relative position is determined on the basis of results of collation of the plurality of local maps, and the satellite information recorded in each of the plurality of local maps.

7. The global map generating device of claim 6, further comprising:

a position computing section that computes an absolute position of the moving body, wherein the local map generating section records, in the local map, the absolute position computed by the position computing section for the at least one point on the locus of positions of the moving body computed by the locus computing section, and the position estimating section estimates an absolute position of the at least one point, on the basis of absolute positions recorded for the at least one point of each of the plurality of local maps that were merged by the merging section.

8. A local map generating device comprising:

an environment information acquiring section that is installed in a moving body, and that acquires environment information of a periphery of the moving body as seen from a set position;

a projected information generating section that generates projected information by projecting a position on the environment information acquired by the environment information acquiring section on a road surface based on a set position and a posture of the environment information acquiring section;

a motion state detecting section that detects a motion state of the moving body;

an azimuth angle estimating section that estimates an azimuth angle of a reference direction of the moving body, on the basis of the motion state of the moving body detected by the motion state detecting section;

a locus computing section that integrates the motion state of the moving body detected by the motion state detecting section, and computes a locus of positions of the moving body on the basis of the integrated motion state of the moving body and the azimuth angle estimated by the azimuth angle estimating section;

a local map generating section that records the projected information in respective regions on a local map that includes the locus of positions of the moving body and that is determined on the basis of the traveling direction of the moving body at each point on the locus;

a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; and a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body; wherein the azimuth angle estimating section estimates the azimuth angel of the reference direction of the moving body on the basis of the motion start of the moving body detected by the motion state detecting section and the velocity information that was computed by the computing section, the locus computing section (i) integrates the velocity vector or the velocity information and (ii) computes the locus of positions of the moving body on the basis of the integrated motion state of the moving body, the integrated velocity vector or the integrated velocity information, and the azimuth angle estimated by the azimuth angle estimating section, and the local map generating section (i) records a starting point of the locus as the origin of the local map, (ii) computes a position on the local map corresponding to the position of the projected information based on the position of the moving body that was computer by the computing section and a traveling direction of the moving body on the locus, and (iii) records the projected information on the local map based on the computed position on the local map.

9. A non-transitory computer-readable storage medium that stores a program for causing a computer to function as respective sections of a local map generating device that includes an environment information acquiring section that is installed in a moving body and that acquires environment information of a periphery of the moving body as seen from a set position, the program causing the computer to function as:

a projected information generating section that generates projected information by projecting a position on the environment information acquired by the environment information acquiring section on a road surface based on a set position and a posture of the environment information acquiring section;

a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites;

a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body;

a locus computing section that integrates the velocity vector or the velocity information of the moving body that was computed by the computing section, and computes a locus of positions of the moving body; and a local map generating section that records the projected information in respective regions on a local map that includes the locus of positions of the moving body and that is determined on the basis of the traveling direction of the moving body at each point on the locus;

wherein the local map generating section (i) records a starting point of the locus as the origin of the local map, (ii) computes a position on the local map corresponding to the position of the projected information based on the position of the moving body that was computed by the computing section and a traveling direction of the moving body on the locus, and (iii) records the projected information on the local map based on the computed position on the local map.

10. A non-transitory computer-readable storage medium that stores a program for causing a computer to function as respective sections of a local map generating device that includes an environment information acquiring section that is installed in a moving body and that acquires environment information of a periphery of the moving body as seen from a set position, the program causing the computer to function as:
  an azimuth angle estimating section that estimates an azimuth angle of a reference direction of the moving body, on the basis of a motion state of the moving body that is detected by a motion state detecting section that detects a motion state of the moving body;
  a locus computing section that integrates the motion state of the moving body detected by the motion state detecting section, and computes a locus of positions of the moving body on the basis of the integrated motion state of the moving body and the azimuth angle estimated by the azimuth angle estimating section;
  a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section;
  a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; and
  a computing section that, on the basis of the satellite information acquired by the satellite information acquiring section, computes a velocity vector that includes a traveling direction of the moving body, or velocity information that expresses a velocity of the moving body and the traveling direction of the moving body, wherein
  the azimuth angle estimating section estimates the azimuth angel of the reference direction of the moving body on the basis of the motion start of the moving body detected by the motion state detecting section and the velocity information computed by the computing section, and
  the locus computing section computes the locus of positions of the moving body on the basis of the motion state of the moving body detected by the motion state detecting section, the velocity information computed by the computing section, and the azimuth angle estimated by the azimuth angle estimating section.

11. A local map generating system comprising:
  an information acquiring device that includes:
  an environment information acquiring section that is installed in a moving body, and that acquires environment information of a periphery of the moving body as seen from a set position;
  a projected information generating section that generates projected information by projecting a position on the environment information acquired by the environment information acquiring section on a road surface based on a set position and a posture of the environment information acquiring section; and
  a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites, and
  a local map generating device that includes:
  a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body;
  a locus computing section that integrates the velocity vector or the velocity information of the moving body that was computed by the computing section, and computes a locus of positions of the moving body; and
  a local map generating section that records the projected information in respective regions on a local map that includes the locus of positions of the moving body and that is determined on the basis of the traveling direction of the moving body at each point on the locus;
  wherein the local map generating section (i) records a starting point of the locus as the origin of the local map, (ii) computes a position on the local map corresponding to the position of the projected information based on the position of the moving body that was computer by the computing section and a traveling direction of the moving body on the locus, and (iii) records the projected information on the local map based on the computed position on the local map.

12. A local map generating system comprising:
  an information acquiring device that includes:
  an environment information acquiring section that is installed in a moving body, and that acquires environment information of a periphery of the moving body as seen from a set position; and
  a motion state detecting section that detects a motion state of the moving body, and
  a local map generating device that includes:
  an azimuth angle estimating section that estimates an azimuth angle of a reference direction of the moving body, on the basis of the motion state of the moving body detected by the motion state detecting section;
  a locus computing section that integrates the motion state of the moving body detected by the motion state detecting section, and computes a locus of positions of the moving body on the basis of the integrated motion state of the moving body and the azimuth angle estimated by the azimuth angle estimating section;
  a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section;

a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites; and a computing section that, on the basis of the satellite information acquired by the satellite information acquiring section, computes a velocity vector that includes a traveling direction of the moving body, or velocity information that expresses a velocity of the moving body and the traveling direction of the moving body, wherein the azimuth angle estimating section estimates the azimuth angel of the reference direction of the moving body on the basis of the motion start of the moving body detected by the motion state detecting section and the velocity information computed by the computing section, and the locus computing section computes the locus of positions of the moving body on the basis of the motion state of the moving body detected by the motion state detecting section, the velocity information computed by the computing section, and the azimuth angle estimated by the azimuth angle estimating section.

13. A global map generating system comprising:
an information acquiring device that includes:
an environment information acquiring section that is installed in a moving body, and that acquires environment information of a periphery of the moving body as seen from a set position;
a projected information generating section that generates projected information by projecting a position on the environment information acquired by the environment information acquiring section on a road surface based on a set position and a posture of the environment information acquiring section; and
a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites, and
a global map generating device that includes:
a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body;
a locus computing section that integrates the velocity vector or the velocity information of the moving body that was computed by the computing section, and computes a locus of positions of the moving body;
a local map generating section that records the projected information in respective regions on a local map that includes the locus of positions of the moving body and that is determined on the basis of the traveling direction of the moving body at each point on the locus;
a local map storage section that stores a plurality of the generated local maps;
a merging section that, between a plurality of local maps, collates the environment information that is recorded in the local maps, and merges the plurality of local maps in a state in which the environment information has been collated;
a position estimating section that estimates an absolute position of at least one point on the locus of the plurality of local maps that were merged by the merging section; and
a global map generating section that, on the basis of the absolute position estimated by the position estimating section, records the plurality of local maps, that were merged by the merging section, on a global map that is expressed by an absolute coordinate system,
wherein the local map generating section (i) records a starting point of the locus as the origin of the local map, (ii) computes a position on the local map corresponding to the position of the projected information based on the position of the moving body that was computer by the computing section and a traveling direction of the moving body on the locus, and (iii) records the projected information on the local map based on the computed position on the local map.

14. A global map generating system comprising:
an information acquiring device that includes:
an environment information acquiring section that is installed in a moving body, and that acquires environment information of a periphery of the moving body as seen from a set position; and
a motion state detecting section that detects a motion state of the moving body, and
a global map generating device that includes:
an azimuth angle estimating section that estimates an azimuth angle of a reference direction of the moving body, on the basis of the motion state of the moving body detected by the motion state detecting section;
a locus computing section that integrates the motion state of the moving body detected by the motion state detecting section, and computes a locus of positions of the moving body on the basis of the integrated motion state of the moving body and the azimuth angle estimated by the azimuth angle estimating section;
a local map generating section that records the environment information, that was acquired by the environment information acquiring section for each point on the locus of positions of the moving body that was computed by the locus computing section, in respective regions on a local map that includes the locus of positions of the moving body and that is determined on the basis of the traveling direction of the moving body at each point on the locus and the set position and posture of the environment information acquiring section;
a local map storage section that stores a plurality of the generated local maps;
a merging section that, between a plurality of local maps, collates the environment information that is recorded in the local maps, and merges the plurality of local maps in a state in which the environment information has been collated;
a position estimating section that estimates an absolute position of at least one point on the locus of the plurality of local maps that were merged by the merging section;
a global map generating section that, on the basis of the absolute position estimated by the position estimating section, records the plurality of local maps, that were merged by the merging section, on a global map that is expressed by an absolute coordinate system;
a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites, and a computing section that, on the basis of the satellite information acquired by the satellite information acquiring section, computes a velocity vector that includes a traveling direction of the moving body, or velocity information that expresses a velocity of the moving body and the traveling direction of the moving body, wherein the azimuth angle estimating section estimates the azimuth angel of the reference direction of the moving body on the basis of the motion start of the moving body detected by the motion state detecting section and the velocity information computed by the computing section, and the locus computing section computes the locus of positions of the moving body on the basis of the motion state of the moving body detected by the motion state detecting section, the velocity information computed by the computing section, and the azimuth angle estimated by the azimuth angle estimating section.

15. A global map generating system comprising:

an information acquiring device that includes:

an environment information acquiring section that is installed in a moving body, and that acquires environment information of a periphery of the moving body as seen from a set position;

a projected information generating section that generates projected information by projecting a position on the environment information acquired by the environment information acquiring section on a road surface based on a set position and a posture of the environment information acquiring section; and a satellite information acquiring section that acquires satellite information that includes information relating to respective positions of a plurality of GPS satellites that are transmitted from the respective GPS satellites, and information relating to distances between the respective GPS satellites and the moving body, and information relating to relative velocities of the moving body with respect to the respective GPS satellites, and a global map generating device that includes:

a computing section that, on the basis of the satellite information acquired by the satellite information acquiring section, computes (i) a position of the moving body, and (ii) a velocity vector that includes a traveling direction of the moving body, or velocity information that expresses a velocity of the moving body and the traveling direction of the moving body;

a locus computing section that integrates the velocity vector or the velocity information of the moving body that was computed by the computing section, and computes a locus of positions of the moving body;

a local map generating section that records the projected information in respective regions on a local map that includes the locus of positions of the moving body and that is determined on the basis of the traveling direction of the moving body at each point on the locus;

a local map storage section that stores the generated local map;

a merging section that, between a plurality of local maps, collates the environment information that is recorded in the local maps, and merges the plurality of local maps in a state in which the environment information has been collated;

a position estimating section that estimates an absolute position of at least one point on the locus of the plurality of local maps that were merged by the merging section; and a global map generating section that, on the basis of the absolute position estimated by the position estimating section, records the plurality of local maps, that were merged by the merging section, on a global map that is expressed by an absolute coordinate system, wherein the local map generating section (i) records a starting point of the locus as the origin of the local map, (ii) computes a position on the local map corresponding to the position of the projected information based on the position of the moving body that was computer by the computing section and a traveling direction of the moving body on the locus, and (iii) records the projected information on the local map based on the computed position on the local map, the local map generating section records, in the local map, the satellite information that was acquired by the satellite information acquiring section, for the at least one point on the locus of positions of the moving body computed by the locus computing section, and the position estimating section estimates the absolute position of the at least one point on the locus of the plurality of merged local maps, on the basis of a relative position between the at least one point of each of the plurality of local maps, which relative position is determined on the basis of results of collation of the plurality of local maps, and the satellite information recorded in each of the plurality of local maps.

* * * * *

UNITED STATES PATENT AND TRADEMARK OFFICE
CERTIFICATE OF CORRECTION

| | | |
|---|---|---|
| PATENT NO. | : 9,103,680 B2 | Page 1 of 1 |
| APPLICATION NO. | : 14/002890 | |
| DATED | : August 11, 2015 | |
| INVENTOR(S) | : Yoshiko Kojima et al. | |

It is certified that error appears in the above-identified patent and that said Letters Patent is hereby corrected as shown below:

In the claims,

Column 32, line 4, in claim 8, delete "angel"
and replace with --angle--

Column 32, line 20, in claim 8, delete "computer"
and replace with --computed--

Column 33, line 49, in claim 10, delete "angel"
and replace with --angle--

Column 34, line 34, in claim 11, delete "computer"
and replace with --computed--

Column 35, line 17, in claim 12, delete "angel"
and replace with --angle--

Column 36, line 17, in claim 13, delete "computer"
and replace with --computed--

Column 37, line 14, in claim 14, delete "angel"
and replace with --angle--

Column 38, line 32, in claim 15, delete "computer"
and replace with --computed--

Signed and Sealed this
Twenty-second Day of December, 2015

Michelle K. Lee
*Director of the United States Patent and Trademark Office*